US008348352B2

(12) United States Patent
Nishino et al.

(10) Patent No.: US 8,348,352 B2
(45) Date of Patent: Jan. 8, 2013

(54) BRAKE CONTROL APPARATUS AND METHOD

(75) Inventors: Kimio Nishino, Hitachinaka (JP); Toshiyuki Innami, Mito (JP); Kenichiro Matsubara, Kasumigaura (JP); Toshiharu Sugawara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1175 days.

(21) Appl. No.: 12/188,938

(22) Filed: Aug. 8, 2008

(65) Prior Publication Data

US 2009/0045672 A1 Feb. 19, 2009

(30) Foreign Application Priority Data

Aug. 17, 2007 (JP) ................................. 2007-212523

(51) Int. Cl.
*B60T 8/88* (2006.01)
(52) U.S. Cl. ............ 303/122.05; 303/122.09; 303/115.2
(58) Field of Classification Search ............. 303/122.05, 303/122.09, 122.13, 115.2
See application file for complete search history.

(56) References Cited

U.S. PATENT DOCUMENTS

| | | | |
|---|---|---|---|
| 5,255,962 A | 10/1993 | Neuhaus et al. | |
| 5,335,301 A | 8/1994 | Newman et al. | |
| 5,567,021 A | 10/1996 | Gaillard | |
| 5,588,720 A | 12/1996 | Mattern | |
| 5,609,399 A | 3/1997 | Feigel et al. | |
| 5,709,438 A | 1/1998 | Isakson et al. | |
| 5,845,976 A | 12/1998 | Muenster | |
| 5,852,788 A * | 12/1998 | Toyoda et al. | 701/74 |
| 6,157,887 A | 12/2000 | Zittlau | |
| 6,161,904 A | 12/2000 | Schmidt et al. | |
| 6,249,736 B1 | 6/2001 | Schmidt et al. | |
| 6,254,202 B1 | 7/2001 | Kawamoto | |
| 6,349,996 B1 | 2/2002 | Heckmann et al. | |
| 6,476,515 B1 | 11/2002 | Yamamoto et al. | |
| 7,168,771 B2 | 1/2007 | Nakano | |
| 7,552,978 B2 | 6/2009 | Yokoyama et al. | |
| 7,673,948 B2 | 3/2010 | Otomo | |
| 2006/0066146 A1 | 3/2006 | Otomo | |
| 2008/0116740 A1 | 5/2008 | Yokoyama et al. | |
| 2008/0257670 A1 | 10/2008 | Drumm et al. | |
| 2009/0115242 A1 | 5/2009 | Ohtani et al. | |

FOREIGN PATENT DOCUMENTS

DE 40 22 671 A1 1/1992

(Continued)

OTHER PUBLICATIONS

K. Nishino, U.S. PTO Office Action, U.S. Appl. No. 12/188,942, dated Sep. 13, 2011, 10 pages.

(Continued)

*Primary Examiner* — Bradley King
(74) *Attorney, Agent, or Firm* — Foley & Lardner LLP

(57) ABSTRACT

A brake control system includes a master cylinder to produce a master cylinder pressure, a brake booster to assist the master cylinder, a first control unit to control the booster, a hydraulic modulator to supply a wheel cylinder pressure to a wheel cylinder, and a second control unit to control the hydraulic modulator. The hydraulic modulator includes a pressure source, such as a pump, to increase the wheel cylinder pressure. The first and second control units are connected together by a communication line. The brake control system may further include a boost condition transmitting section to transmit, through the communicating line, a condition of a boost system formed by the brake booster and the first control unit.

25 Claims, 8 Drawing Sheets

FOREIGN PATENT DOCUMENTS

| | | |
|---|---|---|
| DE | 43 10 061 A1 | 9/1994 |
| DE | 44 15 631 A1 | 11/1994 |
| DE | 43 43 314 A1 | 6/1995 |
| DE | 196 52 889 A1 | 6/1997 |
| DE | 197 03 776 A1 | 8/1998 |
| DE | 197 42 988 C1 | 1/1999 |
| DE | 198 07 366 A1 | 8/1999 |
| DE | 198 07 369 A1 | 8/1999 |
| DE | 100 33 835 A1 | 1/2002 |
| JP | 61-003058 U | 1/1986 |
| JP | 06-107152 A | 4/1994 |
| JP | 10-129446 A | 5/1998 |
| JP | 10-175538 A | 6/1998 |
| JP | 11-078819 A | 3/1999 |
| JP | 2000-247219 A | 9/2000 |
| JP | 2001-097193 A | 4/2001 |
| JP | 2001-138882 A | 5/2001 |
| JP | 2001-513041 A | 8/2001 |
| JP | 2002-331925 | 11/2002 |
| JP | 2004-359060 A | 12/2004 |
| JP | 2006-123889 A | 5/2006 |
| JP | 2007-055560 A | 3/2007 |
| JP | 2007-112426 A | 5/2007 |
| JP | 2007-126032 A | 5/2007 |
| WO | WO 98/35867 A1 | 8/1998 |
| WO | WO 2006/046318 A1 | 5/2006 |
| WO | WO 2007/031398 A1 | 3/2007 |
| WO | WO 2007/034961 A1 | 3/2007 |

OTHER PUBLICATIONS

K. Nishino, U.S. PTO Office Action, U.S. Appl. No. 12/188,942, dated Apr. 26, 2011, 14 pages.

U.S. Appl. No. 12/188,942, filed Aug. 8, 2008, Nishino et al.

K. Nishino, U.S. PTO Notice of Allowance, U.S. Appl. No. 12/188,942, dated Dec. 23, 2011, 5 pages.

U.S. Appl. No. 13/340,106, filed Dec. 29, 2011, Nishino.

* cited by examiner

BRAKE CONTROL APPARATUS AND METHOD

BACKGROUND OF THE INVENTION

The present invention relates to a brake control apparatus including a brake booster and a hydraulic modulator for regulating a brake fluid pressure and/or a brake control method useful in case of a failure in a brake booster.

A master cylinder operates in response to a driver's brake operation, and supplies a brake operating fluid toward one or more wheel cylinders. A power brake booster is a device to operate the master cylinder in addition to a driver's brake operation, and thereby assist the driver's brake operation. A widely used vacuum brake booster generally utilizes an intake vacuum of an internal combustion engine as power for the booster. In some case, a vacuum pump is utilized in substitution for the engine vacuum. However, the use of the vacuum pump tends to increase the possibility of failure in the brake booster more or less. Accordingly, a published Japanese patent specification JP-A-2001-513041 (≈WO9835867A1) shows technique of preventing a decrease of the braking force by controlling a wheel cylinder pressure with the use of a pump in an anti-lock brake control (ABS control) unit at the time of a failure in the brake booster.

SUMMARY OF THE INVENTION

In the above-mentioned technique, after the detection of a failure in the booster, the brake system increases the brake force with the pump when a brake operation is performed. However, since a sensor such as a pressure sensor or a switch is used for detecting a failure in the booster, the brake system is unable to detect a failure until the occurrence of an actual brake operation. Therefore, if a failure occurs during the brake inoperative period during which there is no brake operation, the brake system requires a time to detect a failure after a start of an actual brake operation, and entails a delay from the start of an brake operation to the start of a brake boosting operation. Therefore, there arises a time during which the brake system is unable to provide a boosting function, so that the rise of the braking force becomes slower, the brake stopping distance becomes longer, and there is a danger of panicking the driver.

Therefore, it is an object of the present invention to provide brake control apparatus and/or method suitable for detecting a failure in a boost system while a brake operation is not performed, and for improving the safety.

According to one aspect of the invention, a brake control apparatus comprises: a master cylinder operated by a driver's brake operation; a booster to assist operation of the master cylinder in accordance with the driver's brake operation, to increase a wheel cylinder pressure; a first control unit to control the booster; a fluid pressure regulating hydraulic modulator including a pressure source to increase the wheel cylinder pressure; a second control unit to control the hydraulic modulator; and a communication line connecting the first control unit and the second control unit. The booster may include a boosting mechanism to vary a master cylinder pressure in accordance with a driver's brake operation quantity.

DETAILED DESCRIPTION OF THE INVENTION

Figure 1:
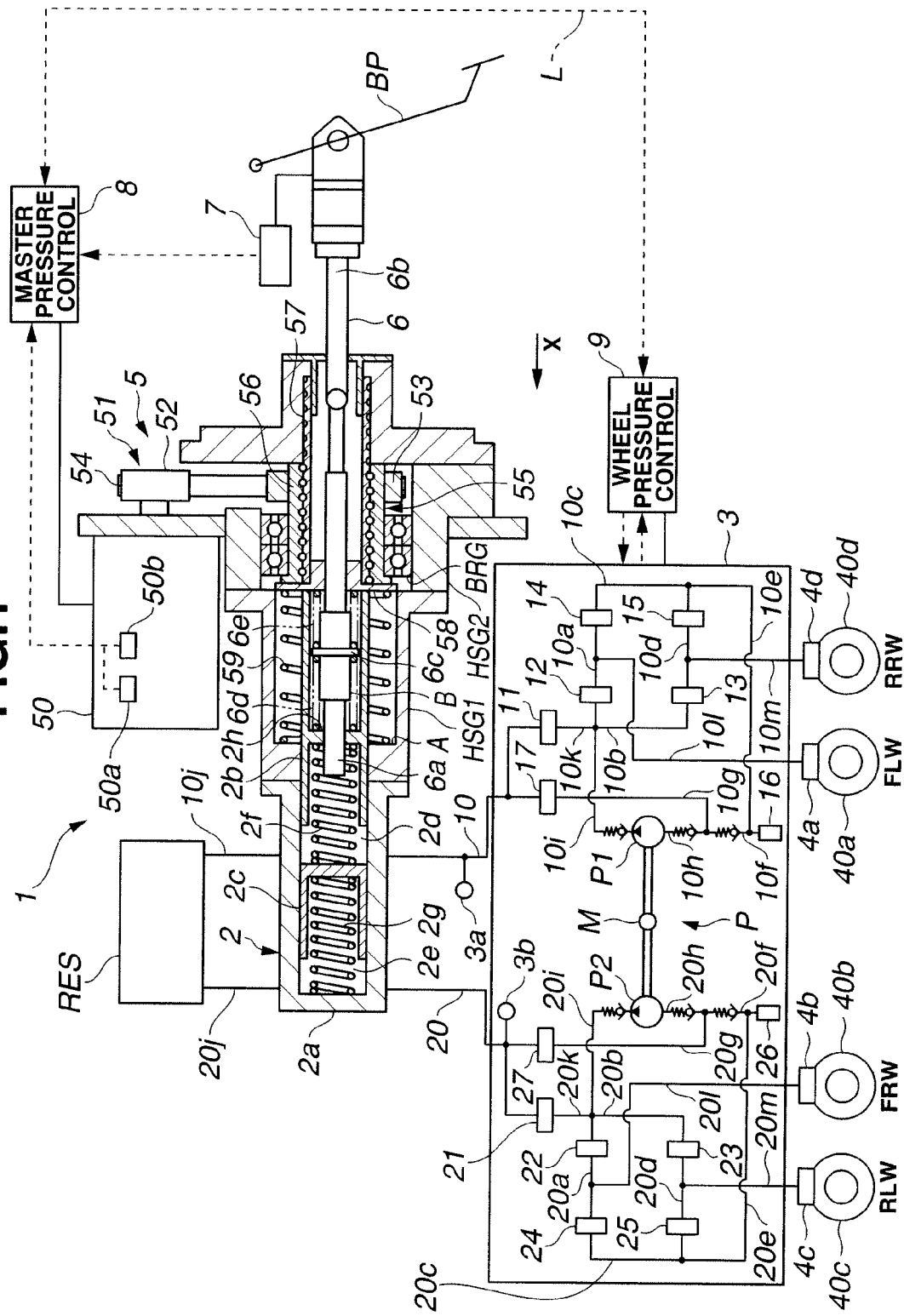
FIG. 1 is a schematic view showing a brake control system according to first, second or third embodiment of the present invention.

FIG. 1 schematically shows a vehicle equipped with a brake control system 1 according to a first embodiment of the present invention. The vehicle includes front left and right wheels FLW and FRW, and rear left and right wheels RLW and RRW. In FIG. 1, broken line arrows represent signal lines indicating the direction of signal flow.

Brake control system 1 shown in FIG. 1 includes: a master cylinder 2, a reservoir tank RES; a wheel pressure regulating section or mechanism 3 (which can serve as a hydraulic modulator); four wheel cylinders 4a-4d, respectively, for the four wheels FLW, FRW, RLW and RRW; a master pressure regulating section or mechanism 5 (which can serve as a brake booster) connected with master cylinder 2; an input rod 6; a brake operation sensing device 7; a master pressure control section or device 8 for controlling the master pressure regulating section 5; and a wheel pressure control section or device 9 for controlling the wheel pressure regulating section 3. Master pressure control section 8 can serve as a first control unit or a first controller, and wheel pressure control section 9 can serve as a second control unit or a second controller.

Together with a brake pedal BP, the input rod 6 can serve as a first pressure varying means for increasing and decreasing a master pressure (or master cylinder pressure) Pmc which is a fluid pressure in master cylinder 2. Master pressure regulating section 5 and master cylinder control section 8 can serve as a second pressure varying means for increasing and decreasing the master pressure Pmc, together with a primary piston 2b of master cylinder 2.

In FIG. 1, an arrow x indicate a positive x direction (or forward direction) along an x axis extending in an axial direction of master cylinder 2. As viewed in FIG. 1, the positive x direction is leftward, and a negative x direction (or rearward direction) is rightward. Master cylinder 2 extends axially in the positive x direction shown by the arrow x, from a second (closer) cylinder end closer to brake pedal BP to a first (remoter) cylinder end remoter from brake pedal BP. Master cylinder 2 of this example is a tandem type master cylinder including the before-mentioned primary piston 2b, and a secondary piston 2c which are slidable in a cylinder case 2a. Along the x axis, primary piston 2b is located between the secondary piston 2c and the second (closer) cylinder end closer to brake pedal BP. Cylinder case 2a includes an inside circumferential surface surrounding and bounding a primary fluid pressure chamber 2d defined axially between the primary and secondary pistons 2b and 2c, and a secondary fluid pressure chamber 2e defined axially between secondary piston 2c and the first (remoter) cylinder end of cylinder case 2a. Primary piston 2b includes a forward facing surface facing in the positive x direction and defining primary pressure chamber 2d. Secondary piston 2c includes a rearward surface facing in the negative x direction toward the forward facing surface of primary piston 2b and defining primary pressure chamber 2d between the forward facing surface of primary piston 2b and the rearward facing surface of secondary piston 2c; and a forward facing surface facing in the positive x direction and defining secondary pressure chamber 2e between the forward facing surface of secondary piston 2c and the end wall of cylinder case 2a defining the first (remoter) cylinder end of master cylinder 2.

Primary pressure chamber 2d is connected with a first brake circuit 10. Secondary pressure chamber 2e is connected with a second brake circuit 20. The volume of primary pressure chamber 2d is varied by relative sliding movement between primary piston 2b and secondary piston 2c in cylinder case 2a. A return spring 2f is disposed in primary pressure chamber 2d, and arranged to push or urge primary piston 2b in the negative x direction. The volume of secondary pressure chamber 2e is varied by movement of secondary piston 2c in cylinder case 2a. A return spring 2g is disposed in secondary pressure chamber 2e and arranged to push or urge the secondary piston 2c in the negative x direction.

Input rod 6 extends in the positive x direction from a rear rod end 6b closer to brake pedal BP, and includes a forward rod end portion 6a extending through a hole in a partition wall 2h of primary piston 2b into the primary pressure chamber 2d. Between the forward rod end portion 6a of input rod 6 and the partition wall 2h of primary piston 2b, there is provided a means for sealing the clearance therebetween to secure the liquid tightness, and allowing axial movement of the forward rod end portion 6a of input rod 6 relative to partition wall 2h along the x axis. The rear rod end 6b of input rod 6 is connected with brake pedal BP. Input rod 6 moves forwards in the positive x direction when brake pedal BP is depressed, and moves rearwards in the negative x direction when brake pedal BP is returned to its release position.

The operating brake fluid (liquid) in primary pressure chamber 2d is pressurized by the forward thrust in the positive x direction of input rod 6 or primary piston 2b (driven by a drive motor 50). The pressurized fluid is supplied through first brake circuit 10 to wheel pressure regulating section (or modulator) 3. By the pressure in primary pressure chamber 2d, the secondary piston 2c is forced in the positive x direction. The brake fluid (liquid) in secondary pressure chamber 2e is pressurized by this thrust of secondary piston 2c in the positive x direction, and supplied through the second brake circuit 20 to wheel pressure regulating section 3.

With this arrangement of input rod 6 interlocked with brake pedal BP and arranged to pressurize the brake fluid in primary pressure chamber 2d, the driver can increase the master pressure Pmc to ensure a required braking force by depressing the brake pedal BP in case of stoppage of drive motor 50 due to a failure. Moreover, the input rod 6 receives a force corresponding to the master pressure Pmc, and transmits the force, as a brake pedal reaction force, to the driver through brake pedal BP. Therefore, this arrangement can eliminate the need for a device such as a spring to produce a required brake pedal reaction. Thus, this arrangement is effective to reduce the size and weight of the brake control system and to improve the ease of installation of the brake control system.

The before-mentioned brake operation sensing device 7 is a sensor for sensing a driver's brake operation quantity or a driver's brake input. The brake operation sensing device 7 is provided near the rear rod end 6b of input rod 6, and arranged to sense a brake force requested by the driver. The brake operation sensing device 7 of this example includes a displacement sensor (or stroke sensor for sensing a stroke of brake pedal BP) for sensing a displacement quantity of input rod 6 in the x direction. More specifically, in this example, brake operation sensing device 7 includes first and second displacement sensors 7a and 7b. Brake operation sensing device 7 is connected with master pressure control section 8, and arranged to supply the displacement quantities sensed by the displacement sensors 7a and 7b to the control section 8. With two displacement sensors 7a and 7b, the brake operation sensing device 7 can sense a driver's brake request even if one of the displacement sensors fails, and thereby ensure the proper operation of the brake control system fail-safely.

The brake operation sensing device 7 may be arranged to include a pedal force sensor for sensing a force applied to brake pedal BP, or a combination of such a pedal force sensor and a stroke sensor.

Reservoir tank RES includes at least two fluid chambers separated by a partition and connected, respectively, through fluid passages 10j and 20j with the primary and secondary pressure chambers 2d and 2e of master cylinder 2.

Wheel pressure regulating section or mechanism 3 is a hydraulic pressure control unit (serving as a hydraulic modulator) capable of performing an ABS control, a control for stabilizing a vehicle behavior etc. Wheel pressure regulating section 3 supplies the fluid pressurized by master cylinder 2 or the like, to each wheel cylinder 4a~4d in response to a control command of the wheel pressure control section 9.

It is possible to use, as the wheel cylinders 4a~4d, actuators of known types. Wheel cylinders 4a~4d of this example are hydraulic actuators each including a cylinder, a piston and a pad. By receiving the pressure from wheel pressure regulating section 3, each of wheel cylinders 4a~4d can press the pad on a corresponding one of disk rotors 40a~40d with the piston. Each of the four disk rotors 40a~40d is arranged to rotate, as a unit, with a corresponding one of the front and rear wheels FLW, FRW, RLW and RRW. Brake torques applied to disk rotors 40a~40d produce brake forces between the four wheels and the road surface.

Master pressure regulating section 5 includes a mechanism to vary the displacement quantity of primary piston 2b, that is the master pressure Pmc, in response to a control command of master pressure control section 8. Master pressure regulating section 5 shown in FIG. 1 includes a drive motor 50, a speed reducer 51 and a rotation-translation converting device 55.

Master pressure controlling section 8 (which can serve as the first control unit) includes a processing circuit or processor to control the operation of drive motor 50 in accordance with sensor signals supplied from brake operation sensing device 7 and drive motor 50.

Wheel pressure controlling section 9 (which can serve as the second control unit) includes a processing circuit or processor to calculate a desired target brake force to be produced for each of the four wheels FLW, FRW, RLW and RRW in accordance with input information including a vehicle-to-vehicle distance to a preceding vehicle, road information, and one or more vehicle operating conditions or vehicle motion variables (such as yaw rate, longitudinal acceleration, lateral acceleration, steering wheel angle, wheel speeds and vehicle body speed). In accordance with the calculated target brake forces, the wheel pressure controlling section 9 controls the operations of actuators (such as solenoid valves and pump) of wheel pressure regulating section 3.

A signal line L connects the master pressure controlling section 8 and wheel pressure controlling section 9, and enables communication between both controlling sections 8 and 9. Signal line L can serve as a communication line of a communicating section connecting the first and second control units (8, 9).

Wheel pressure regulating section 3 has a hydraulic brake circuit constructed as explained below.

The brake circuit includes two independent systems; a primary system and a secondary system. The primary system receives the supply of the brake fluid from primary pressure chamber 2d of master cylinder 2, and regulates the brake forces of front left wheel FLW and rear right wheel RRW through the first brake circuit 10. The secondary system receives the supply of the brake fluid from secondary pressure chamber 2e of master cylinder 2, and regulates the brake forces of front right wheel FRW and rear left wheel RLW through the second brake circuit 20. With this arrangement called X piping configuration, even if one of the primary and secondary systems becomes unable to function properly, the brake system can secure the brake forces of the diagonally separated two wheels by using the other system remaining in a normal state, and thereby maintain a stable vehicle behavior. The following explanation takes, as an example, the primary system.

The brake circuit 10(20) includes a common supply circuit segment 10k(20k) extending from an upstream port connected with master cylinder 2 (primary pressure chamber 2d or secondary pressure chamber 2e), to a first junction point, a first branch segment 10a(20a) extending from the first junction point to a second junction point, a first supply segment 10l(20l) extending from the second junction point to the wheel cylinder 4a(4b), a second branch segment 10b(20b) extending from the first junction point to a third junction point, a second supply segment 10m(20m) extending from the third junction point to the wheel cylinder 4d(4c), a first return segment 10c(20c) extending from the second junction point to a fourth junction point, a second return segment 10d(20d) extending from the third junction point to the fourth junction point, a common return circuit segment 10e extending from the fourth junction point to a reservoir 16(26).

An outer gate valve 11(21) (which can serve as a first gate valve) is provided in the common supply segment 10k, and arranged to open to supply the brake fluid pressurized by master cylinder 2, to the wheel cylinders 4a(4b) and 4d(4c). First and second pressure increase valves 12(22) and 13(23) are provided, respectively, in the first and second branch segments 10a(20a) and 10b(20b), and arranged to open to supply the brake fluid pressurized by master cylinder 2 or the later-mentioned pump P, to the wheel cylinders 4a(4b) and 4d(4c). First and second pressure decrease valves 14(24) and 15(25) are provided, respectively, in the first and second return segments 10c(20c) and 10d(20d), and arranged to open to decrease the wheel pressures (Pwc) which are the pressures in the wheel cylinders 4a(4b) and 4d(4c).

The brake circuit 10(20) further includes a suction circuit segment 10g(20g) extending from the upstream port connected with master cylinder 2, to a fifth junction point, a return circuit segment 10f(20f) extending from reservoir 16(26) to the fifth junction point, and a suction segment 10h(20h) extending from the fifth junction point to the pump P. An inner gate valve 17(27) (which can serve as a second gate valve) is provided in the suction circuit segment 10g (20g), and arranged to open and close the suction circuit segment 10g(20g). For example, the inner gate valve 17(27) is opened to supply, to the wheel cylinders 4a(4b) and 4d(4c), the pressure increased by the pump beyond the pressure supplied from master cylinder 2.

The brake circuit 10 is connected with the pump P serving as a pressure source provided in addition to master cylinder 2.

The pump P of this example is a gear type pump for sucking and discharging the brake fluid. When the pressure higher than the pressure produced by master cylinder 2, for example, in an automatic braking operation of a vehicle behavior stabilizing control, the pump P is operated to increase the master pressure Pmc of master cylinder 2, and supply the increased pressure to the wheel cylinders. In the example shown in FIG. 1, the pump P is composed of a first pump P1 for first brake circuit 10 and a second pump P2 for second brake circuit 20. Pump P1(P2) includes an inlet port connected with the suction circuit segment 10h(20h), and an outlet port connected with the circuit segment 10k(20k) by a discharge circuit segment 10i(20i) extending from the outlet port of pump P1(P2) to the first junction point.

A motor M of this example is a (DC) brushless motor. Each of pumps P1 and P2 is connected with a motor output shaft of motor M. Motor M receives electric power supplied under a control command of wheel pressure control section 9, and drives first and second pumps P1 and P2.

The outer gate valve 11(21), inner gate valve 17(27), pressure increase valves 12(22) and 13(23), and pressure decrease valves 14(24) and 15(25) are all electromagnetic solenoid valves opened and closed by electric energization and deenergization. Wheel pressure control section 9 can control the valve opening degrees of these solenoid valves individually by producing a drive signal to each valve, and supplying a drive current corresponding to the drive signal to each valve.

The outer gate valve 11(21) and pressure increase valves 12(22) and 13(23) are normally-open valves, whereas the inner gate valve 17(27) and pressure decrease valves 14(24) and 15(25) are normally-closed valves. With this configuration, the brake circuit 10(20) can produce the braking force as requested by the driver by supplying the brake fluid pressurized by master cylinder 2 to the wheel cylinders 4a(4b) and 4d(4c) even if a failure causes a stoppage of the supply of power to any one of the solenoid valves. However, it is optional to employ the configuration in which the outer gate valve 11(21) and pressure increase valves 12(22) and 13(23) are normally-closed valves whereas the inner gate valve 17(27) and pressure decrease valves 14(24) and 15(25) are normally-open valves.

The second brake circuit 20 is substantially identical in construction to the first brake circuit 10.

A master (cylinder) pressure sensor is a sensor for sensing the master (cylinder) pressure Pmc. In the example of FIG. 1, the master pressure sensor include a primary master pressure sensing device 3a provided in the first brake circuit 10, for sensing the master pressure Pmc on the primary side (the pressure in primary pressure chamber 2d), and a secondary master pressure sensing device 3b provided in the second brake circuit 20, for sensing the master pressure Pmc on the secondary side (the pressure in secondary pressure chamber 2e). In the example of FIG. 1, the master pressure sensing device 3a is disposed between master cylinder 2 and wheel pressure regulating section 3 (outside the section 3) whereas the master pressure sensing device 3b is provide inside the wheel pressure regulating section 3. Information sensed by master pressure sensing devices 3a and 3b is supplied to master pressure controlling section 8 and wheel pressure controlling section 9. It is possible to determine the number and the positions of master pressure sensing devices appropriately without being limited to the example of FIG. 1, in consideration of the controllability and the fail-safe performance.

The wheel pressure regulating section 3 is operated as follows. In a normal control state, the brake fluid is supplied from master cylinder 2 to the wheel cylinders 4a~4d through first and second brake circuits 10 and 20, and the wheel cylinders produce brake forces.

In the ABS control, the brake system performs a pressure decrease operation, in the case of front left wheel FLW for example, by opening the pressure decrease valve 14 connected with wheel cylinder 4a and closing the pressure increase valve 12, and thereby returning the brake fluid from wheel cylinder 4a to reservoir 16. When front left wheel FLW recovers from a locking tendency, the brake system performs a pressure increase operation by opening the pressure increase valve 12 and closing the pressure decrease valve 14. In this case, pump P returns the brake fluid from reservoir 16 to the brake circuit segment 10k.

In the automatic brake control for the vehicle behavior stabilizing control or other controls, the outer gate valves 11 and 21 are closed and the inner gate valves 17 and 27 are opened. At the same time, the pump P is driven to discharge the brake fluid from master cylinder 2 through the suction segments 10g, 10h, 20g and 20h and discharge segments 10i and 20i, to the circuit segments 10k and 20k. Moreover, the brake system controls the outer gate valves 11 and 21 and/or the pressure increase valve 12, 13, 22 and 23 so as to control the wheel pressure Pwc to the desired target pressure to achieve a required braking force.

When the driver performs a brake operation by depressing the brake pedal, the master cylinder 2 produces the master pressure. Normally, the brake system produces a higher master pressure by amplifying the axial force of the brake pedal (corresponding to a thrust force of input rod 6) with a boost system (corresponding to master pressure regulating mechanism 5 and master pressure controlling section 8). In case of a failure in this boost system, however, the brake system becomes unable to increase the master pressure.

To increase the wheel pressure as compared to the master pressure produced by the driver's brake pedal depression force is equivalent to the brake boosting. Accordingly, it is possible to achieve a booster system by setting a target wheel pressure higher than the master pressure by a pressure difference corresponding to a predetermined boost ratio, and by controlling the actual wheel pressure to the target wheel pressure. Therefore, in the brake control system 1 according to the first embodiment, the wheel pressure regulating mechanism 3 is arranged to perform the function of maintaining the above-mentioned pressure difference by the control of outer gate valves 11 and 21 (a backup control mentioned later).

The wheel pressure regulating section 3 performs a brake boost control in the following manner, with the controls of pump P, inner gate valves 17 and 27 and outer gate valves 11 and 21. In brief outline, the brake system achieves the brake boosting operation by opening inner gate valves 17 and 27, holding the pump P in a state capable of discharging a predetermined fluid pressure with a drive control, and controlling outer gate valve 11 and 21 to control the pressure difference. The following is explanation more in detail with reference to first brake circuit 10 as an example.

Outer gate valve 11 includes a coil for producing an electromagnetic attraction force, a movable valve element moving in accordance with the attraction force and regulating the valve opening degree, and a valve body having an upstream port connected with master cylinder 2 and a downstream port connected with the first junction point.

The valve element receives a force Fwc in the valve opening direction corresponding to the pressure on the downstream or wheel cylinders' side, a force Fmc in the valve closing direction corresponding to the pressure on the upstream or master cylinder's side, and a force Fb in the valve closing direction corresponding to the electromagnetic attraction. Since outer gate valve 11 is a normally open valve, the valve element further receives a force in the valve opening direction caused by a spring. However, the spring force is neglected in the following explanation. (It is possible to take this spring force into account by setting an offset value.)

The movable valve element is held at a position balanced by these forces. In other words, the movable valve element remains stationary when Fmc+Fb−Fwc=0 (Fb=Fwc−Fmc); moves in the valve closing direction when Fmc+Fb−Fwc>0 (Fb>Fwc−Fmc); and moves in the valve opening direction when Fmc+Fb−Fwc<0 (Fb<Fwc−Fmc). Force Fmc is related with master pressure Pmc, and force Fwc is related with wheel pressure Pwc. Therefore, the difference (Fwc−Fmc) is related with a target pressure difference ΔP which is a desired pressure difference between master pressure Pmc and wheel pressure Pwc to be achieved by the boost control. On the other hand, the position of the valve element is determined by the balance between Fb and (Fwc−Fmc). Consequently, the position of the valve element to achieve the target pressure difference ΔP can be automatically determined by setting the electromagnetic attraction force Fb at a magnitude equaling (Fwc−Fmc) corresponding to the target pressure difference ΔP.

The target pressure difference ΔP is determined in accordance with the master pressure Pmc sensed by master pressure sensor (3a, 3b) and a desired target boost ratio?. However, it is optional to receive the brake operation quantity sensed by brake operation sensor 7, from master pressure control section 8, and to determine target pressure difference ΔP in accordance with the sensed brake operation quantity.

To achieve the boost control by using wheel pressure regulating mechanism 3, the pressure regulating mechanism (modulator) 3 is controlled to make the wheel pressure Pwc higher than the master pressure Pmc by producing a higher pressure on the wheel cylinder's or downstream side of outer gate valve 11(21) in the downstream hydraulic circuit section between outer gate valve 11(21) and wheel cylinders 4a and 4d (4b and 4c). If, in this case, the electromagnetic attraction force Fb is set equal to a value corresponding to target pressure difference ΔP, the pressure regulating mechanism 3 can achieve the target wheel pressure Pwc by shifting the position of the valve element automatically in accordance with a boosting operation in the downstream section toward wheel cylinders 4a and 4d. When, for example, the wheel pressure Pwc is higher than the target value, the movable valve element moves in the valve opening direction and acts to decrease the wheel pressure Pwc by allowing the brake fluid to flow from wheel cylinders 4a and 4d to the master cylinder's or upstream side automatically until the target pressure difference ΔP is achieved. Thus, the brake system can control the wheel pressure Pwc automatically to a desired pressure level without the need for performing a feedback control using a pressure sensor for sensing an actual wheel cylinder pressure.

Thus, the brake system can eliminate the need for a complicated feedback control system as mentioned before. Moreover, the brake system makes it possible to absorb a control error of motor M with outer gate valve 11. Namely, if the electromagnetic attraction force Fb corresponding to the target pressure difference ΔP is produced in a manner of feedforward control in accordance with the master pressure Pmc corresponding to the driver's brake pedal depression force, the outer gate valve 11 can achieve the target pressure difference ΔP, and performs the function similar to the function of a feedback control mechanism. Therefore, the brake system does not require a sensor for sensing a condition of a controlled system, and other parts which would be required in the electronic feedback control system, and the control stability is very high.

While the outer gate valve 11 is controlled as mentioned above, the pump P1 is driven basically in the open state in which inner gate valve 17 is open. Since pump P1 is driven by motor M, the brake system may be configured, for example, to set a preset condition such as a minimum rotational speed to achieve a discharge pressure capable of supply a multiplied wheel pressure Pwc determined in accordance with master pressure Pmc, and to drive motor M so as to achieve the minimum rotational speed. By so doing, the brake system can control the wheel pressure Pwc to a desired pressure by supplying the required pressure from pump P1.

As mentioned before, the pump P1 sucks the brake fluid from master cylinder 2 through fluid circuit sections 10g and 10h, and discharges the brake fluid toward the wheel cylinders 4a and 4d. Accordingly, without the need for providing a stroke simulator, the brake system can ensure a driver's brake pedal stroke. Moreover, by requiring only the detection of master pressure Pmc, the brake system can achieve the boost system (perform the later-mentioned backup control, that is) even if a stroke sensor (the brake operation sensor 7) fails.

Master pressure regulating mechanism (or brake booster) 5 (including drive motor 50, speed reducer 51 and rotation-translation converting device 55 as mentioned before) is constructed and operated as follows:

Drive motor 50 is a three-phase brushless motor, in this example. By being driven by receiving electric power supplied in accordance with a control command of master pressure control unit 8, the motor 50 produces a desired rotational torque.

Speed reducer 51 of this example is arranged to reduce the speed of the output rotation of drive motor 50 by using a belt drive. Speed reducer 51 includes a driver pulley 52 of a smaller diameter mounted on the output shaft of drive motor 50, a follower pulley 53 of a larger diameter, and a belt 54 connecting the driver and follower pulleys 52 and 53. Follower pulley 53 is mounted on a ball screw nut 56 of the rotation-translation converting device 55. Speed reducer 51 multiplies the torque of motor 50 by an amount corresponding to a speed reduction ratio (a ratio between the radii of driver and follower pulleys 52 and 53), and transmits the rotation from the motor 50 to rotation-translation converting device 55.

When the torque of drive motor 50 is great enough so that the torque multiplication is not required, it is optional to omit the speed reducer 51 and connect the motor 50 directly with rotation-translation converting mechanism 55. This arrangement can avoid problems due to the intervention of speed reducer 51 about the reliability, noise level, and the ease in installation.

Rotation-translation converting device 55 coverts rotational power of drive motor 50 to translational power, and pushes the primary piston 2b of master cylinder 2 with this translational power. Converting device 55 of this example includes a ball screw type converting mechanism composed of the ball screw nut 56, a ball screw shaft 57, a movable member 58 and a return spring 59.

A first housing member HSG1 is connected with master cylinder 2 on the negative x side of case 2a, and a second housing member HSG2 is connected with first housing member HSG1 on the negative x side. That is, first housing member HSG1 is disposed between cylinder case 2a and second housing member HSG2. Ball screw nut 56 is rotatably supported and surrounded by a bearing BRG provided in second housing member HSG2. Follower pulley 53 is fit over a negative x side portion of the ball screw nut 56. The ball screw shaft 57 is a hollow shaft screwed in the ball screw nut 56. In a clearance between ball screw nut 56 and ball screw shaft 57, there are provided a plurality of balls in a manner enabling rolling movement.

Movable member 58 is fixed to the positive x side of ball screw shaft 57, and primary piston 2b is joined to a positive x side surface of movable member 58. Primary piston 2b is received in first housing member HSG1. The forward (positive x side) end of primary piston 2b projects out of first housing member HSG1, and fits in the cylinder case 2a of master cylinder 2.

Return spring 59 is disposed around primary piston 2b, in first housing member HSG1. The positive x side end of return spring 59 is fixed to an inside negative x side surface A of an inside cavity of first housing member HSG1 whereas the negative x side end of return spring 59 is connected with movable member 58. Return spring 59 is disposed under compression between the inside surface A of first housing member HSG1 and movable member 58, and arranged to urge the movable member 58 and ball screw shaft 57 in the negative x direction (rightward in FIG. 1).

Ball screw nut 56 rotates as a unit with follower pulley 53. In accordance with the rotation of ball screw nut 56, the ball screw shaft 57 moves linearly in the x direction. When moved in the positive x direction (leftward direction in FIG. 1), the ball screw shaft 57 pushes the primary piston 2a in the positive x direction through movable member 58. In the state shown in FIG. 1, the ball screw shaft 57 is located at an initial position where the displacement of ball screw shaft 57 in the negative x direction is maximum when the brake is inoperative.

On the other hand, ball screw shaft 57 receives a resilient force of return spring 59 in the negative x direction opposite to the thrust force in the positive x direction. Therefore, return spring 59 can return the ball screw shaft 57 to the initial position if the drive motor 50 stops because of a failure and becomes unable to return the ball screw shaft 57 to the initial position in the state in which the primary piston 2b is pushed in the positive x direction to increase the master pressure Pmc. Therefore, the brake system can decrease the master cylinder Pmc to a minimum level near zero by returning the ball screw shaft 57 to the initial position, and thereby prevent drag of a braking force, and hence unstable vehicle behavior due to the drag of the braking force.

In an annular space B defined between the input rod 6 and primary piston 2b, there are provided springs 6d and 6e. Spring 6d includes a first end retained by a flange 6c formed in input road 6, and a second end retained by partition wall 2h of primary piston 2a. Spring 6e includes a first end retained by the flange 6c of input rod 6 and a second end retained by movable member 58. The pair of springs 6d and 6e act to urge the input rod 6 toward a neutral position relative to primary piston 2b, and hold the input rod 6 in the neutral position relative to primary piston 2b in the brake inoperative state. When input rod 6 and primary piston 2b move in either direction away from the neutral position, the springs 6d and 6e apply the urging force to the input rod 6 toward the neutral position relative to primary piston 2b.

Drive motor 50 is provided with a motor rotation angle sensor 50a which senses a rotation angle of the motor output shaft and sends a sensor signal representing the angular position of the motor output shaft to the master pressure control unit 8. Master pressure control unit 8 calculates the motor rotation angle of drive motor 90 from the sensor signal of rotation angle sensor 50a, and calculates, from the motor rotation angle, a thrust quantity of converting device 25, that is an axial displacement quantity of primary piston 2b in the x direction.

Drive motor 50 is further provided with a motor temperature sensor 50b which senses a temperature of drive motor 50 and sends information on the sensed temperature condition of motor 50 to master pressure control unit 8.

Master pressure regulating mechanism 5 and master pressure control unit 8 form a boost control system for boosting the master pressure by amplifying the thrust of input rod 6 in the following manner.

Master pressure regulating mechanism 5 and master pressure control unit 8 move primary piston 2b in accordance with the displacement of input rod 6 caused by a driver's brake operation or driver's brake input, and the fluid in primary pressure chamber 2d is pressurized by the thrust of input rod 6 and the thrust of primary piston 2b, to regulate the master pressure Pmc. Thus, the thrust of input rod 6 is amplified. The amplification ratio (hereinafter referred to as a boost ratio α) is determined in accordance with various conditions such as a ratio between cross sectional areas (pressure receiving areas AIR and App) of input rod 6 and primary piston 2b in primary pressure chamber 2d, in the following manner.

The pressure regulation of master pressure Pmc is performed on the basis of a pressure balance relationship expressed by the following equation (1).

$$Pmc=(FIR+K\times\Delta x)/AIR=(Fpp-K\times\Delta x)/App \quad (1)$$

In this equation: Pmc is the fluid pressure (master cylinder pressure) in primary pressure chamber 2d; FIR is the thrust force of input rod 6; Fpp is the thrust force of primary piston 2b; AIR is the pressure receiving area of input rod 6; App is the pressure receiving area of primary piston 2b, K is a spring constant of springs 6d and 6e; and Δx is a relative displacement quantity of input rod 6 and primary piston 2b.

The relative displacement quantity Δx is defined, by using a displacement xIR of input rod 6 and a displacement xpp of primary piston 2b, as ΔX=xpp−xIR. Therefore, Δx=0 at the neutral relative position; Δx is positive when the primary piston 2b moves relative to the input rod 6 forward in the positive x (leftward) direction; and Δx is negative when the primary piston 2b moves relative to the input rod 6 rearward in the negative x (rightward) direction. In the pressure balance equation (1), a sliding resistance of the seal is neglected. Thrust force Fpp of primary piston 2b can be estimated from the electric current of drive motor 50. On the other hand, the boost ratio α can be expressed by the following equation (2).

$$\alpha=Pmc\times(App+AIR)/FIR \quad (2)$$

By substituting Pmc of equation (1) into equation (2), the boost ratio α is given by the following equation (3).

$$\alpha=(1+K\times\Delta x/FIR)\times(AIR+App)/AIR \quad (3)$$

The boost control system controls drive motor 50 (or the displacement xpp of primary piston 2b) so as to obtain a desired target master pressure characteristic which is a characteristic of variation in master pressure Pmc with respect to displacement xIR of input rod 6. In accordance with a stroke characteristic representing the displacement xpp of primary piston 2b with respect to displacement xIR of input rod 6, and the above-mentioned target master pressure characteristic, it is possible to obtain a target displacement calculating characteristic representing a variation of the relative displacement quantity Δx with respect to displacement xIR of input rod 6. By using target displacement calculating characteristic data obtained by verification or experimentation, a target value of the relative displacement quantity Δx (hereinafter referred to as target displacement quantity Δx*) is calculated.

The target displacement calculating characteristic represents a characteristic of variation of target displacement quantity Δx* with respect to displacement xIR of input rod 6, and determines one value of the target displacement quantity Δx* from one value of displacement quantity xIR of input rod 6. The brake system can produce the master pressure Pmc in master cylinder 2, corresponding to the target displacement quantity Δx*, by controlling the rotation of motor 50 (the displacement quantity xpp of primary piston 2b) so as to achieve the target displacement quantity Δx* determined in accordance with the sensed displacement quantity xIR of input rod 6.

The displacement quantity xIR is sensed by brake operation quantity sensor 7; the displacement quantity xpp of primary piston 2b is calculated from the signal of the motor rotation angle sensor 50a; and the relative displacement quantity Δx is determined by the difference between the thus-determined displacement quantities xIR and xpp. The boost control system determines the target displacement quantity Δx* by using sensed displacement quantity xIR and the target displacement calculating characteristic, and controls the drive motor 50 (in a manner of feedback control) so as to reduce a deviation of the sensed (or calculated) actual relative displacement quantity Δx and the target displacement quantity Δx* to zero. It is optional to further provide a stroke sensor for sensing the displacement quantity xpp of primary piston 2b.

The thus-constructed system performing the boost control without using a pedal depression force sensor is advantageous in cost reduction. Furthermore, this boost control system can obtain a greater boost ratio greater than a mechanical boost ratio determined by the ratio of pressure receiving areas (AIR+App)/AIR or a smaller boost ratio smaller than the mechanical boost ratio, by controlling the drive motor 50 so as to control the relative displacement quantity Δx to a desired value, and thereby produce a braking force based on a desired boost ratio.

In the case of a constant boost control, the boost control system controls the motor 50 so as to move the input rod 6 and primary piston 2b as a unit so that the primary piston 2b is always held at the neutral position relative to input road 6, and the relative displacement quantity Δx is held equal to zero. When primary piston 2b is operated so that Δx=0, the boost ratio is uniquely determined by α=(AIR+APP)/AIR according to equation (3). Therefore, the boost control system can provide a constant boost ratio by setting the pressure receiving areas AIR and APP based on the required boost ratio and controlling primary piston 2b so that its displacement quantity xPP remains equal to displacement quantity xIR.

In the target master pressure characteristic in the constant boost control, the master pressure Pmc is increased, by forward movement of input rod 6 in the positive x direction, in the form of a curve of a multiple order such as a curve of the second, third or higher degree or such as a composite curve formed from two or more of these curves. In the constant boost control, the stroke characteristic is such that the primary piston 2b is displaced by an amount equaling the displacement quantity xIR of input rod 6 (xPP=xIR). In the target displacement calculating characteristic obtained from this stroke characteristic and the above-mentioned target master pressure characteristic, the target displacement quantity Δx* is held equal to zero for all values of the displacement quantity xIR of input rod 6.

In the case of a variable boost control, the boost control system sets the target displacement quantity Δx* to a positive value, and controls drive motor 50 so as to control the actual displacement quantity Δx toward the positive target quantity Δx*. As a result, the displacement quantity xPP of primary piston 2*b* is made greater than displacement quantity xIR of input rod 6 as the input rod 6 moves forward in the direction to increase the master pressure Pmc. According to equation (3), the boost ratio α becomes equal to the pressure receiving area ratio (AIR+App)/AIR multiplied by (1+K×Δx/FIR). This is equivalent to the displacement of primary piston 2*b* by the quantity obtained by multiplying the displacement quantity xIR of input rod 6 by the proportional gain (1+K×Δx/FIR). In this way, the boost ratio α is varied in dependence on Δx, and the master pressure regulating mechanism 5 works as a booster, and produce a braking force as requested by the driver with a reduced pedal force.

Although, from the viewpoint of the controllability, the proportional gain (1+K×Δx/FIR) is desirably set equal to one, the boost control system can increase the proportional gain (1+K×Δx/FIR) beyond one temporarily when a greater braking force is required beyond the driver's brake operation quantity in an emergency brake, for example. By so doing, the brake system can produce a greater braking force by increasing the master pressure Pmc beyond the normal level (determined by the proportional gain (1+K×Δx/FIR) set equal to one) for the same brake operation quantity. For example, the brake system may be arranged to detect an emergency brake operation by examining whether a time rate of change of the signal of brake operation sensing device 7 is greater than a predetermined value or not.

Thus, the variable boost control is a method for controlling drive motor 50 in such a manner as to advance the forward movement of primary piston 2*b* beyond the forward movement of input rod 6, to increase the relative displacement quantity Δx of primary piston 2*b* relative to input rod 6 with the forward movement of input rod 6, and correspondingly to increase the master pressure Pmc more than the increase of the constant boost control, with the forward increase of input rod 6.

In the target master pressure characteristic in the variable boost control, the master pressure Pmc is increased, by forward movement of input rod 6 in the positive x direction, more steeply as compared to the increase in the form of a curve of a multiple order in the constant boost control. In the variable boost control, the stroke characteristic is such that the increase of displacement xPP of primary piston 2*b* with respect to the increase of displacement xIR of input rod 6 is greater than one. In the target displacement calculating characteristic obtained from this stroke characteristic and the above-mentioned target master pressure characteristic, the target displacement quantity Δx* is increased at a predetermined rate with increase of displacement xIR of input rod 6.

In addition to the above-mentioned (increasing) control mode of controlling drive motor 50 to increase the displacement xPP of primary piston 2*b* as compared to displacement xIR of input rod 6 with forward movement of input rod 6 in the direction to increase master pressure Pmc, the variable boost control may further include a (decreasing) control mode of controlling drive motor 50 to decrease the displacement xPP of primary piston 2*b* as compared to displacement xIR of input rod 6 with forward movement of input rod 6 in the direction to increase master pressure Pmc. Thus, by decreasing the proportional gain (1+K×Δx/FIR) below one, the variable boost control is applicable to a regenerative brake control of decreasing the brake pressure by an amount corresponding to a regenerative brake force of a hybrid vehicle.

Instead of the above-mentioned variable boost control based on relative displacement quantity Δx, it is possible to achieve the variable boost control by controlling master pressure regulating mechanism 5 (drive motor 50) in a feedback control mode so as to reduce a deviation of the actual master pressure Pmc sensed by the master pressure sensor (3*a*, 3*b*) from the target master pressure. It is possible to changeover the variable boost control among these modes in dependence on the situation.

The variable boost control based on relative displacement quantity Δx is a control which is not directly based on the sensed master pressure Pmc. Therefore, the control system can take measures against a failure by comparing the sensed actual master pressure Pmc with the master pressure (target master pressure) corresponding to xIR in the target master pressure characteristic, to check whether the master pressure Pmc is produced correctly to a intended level.

Figure 2:
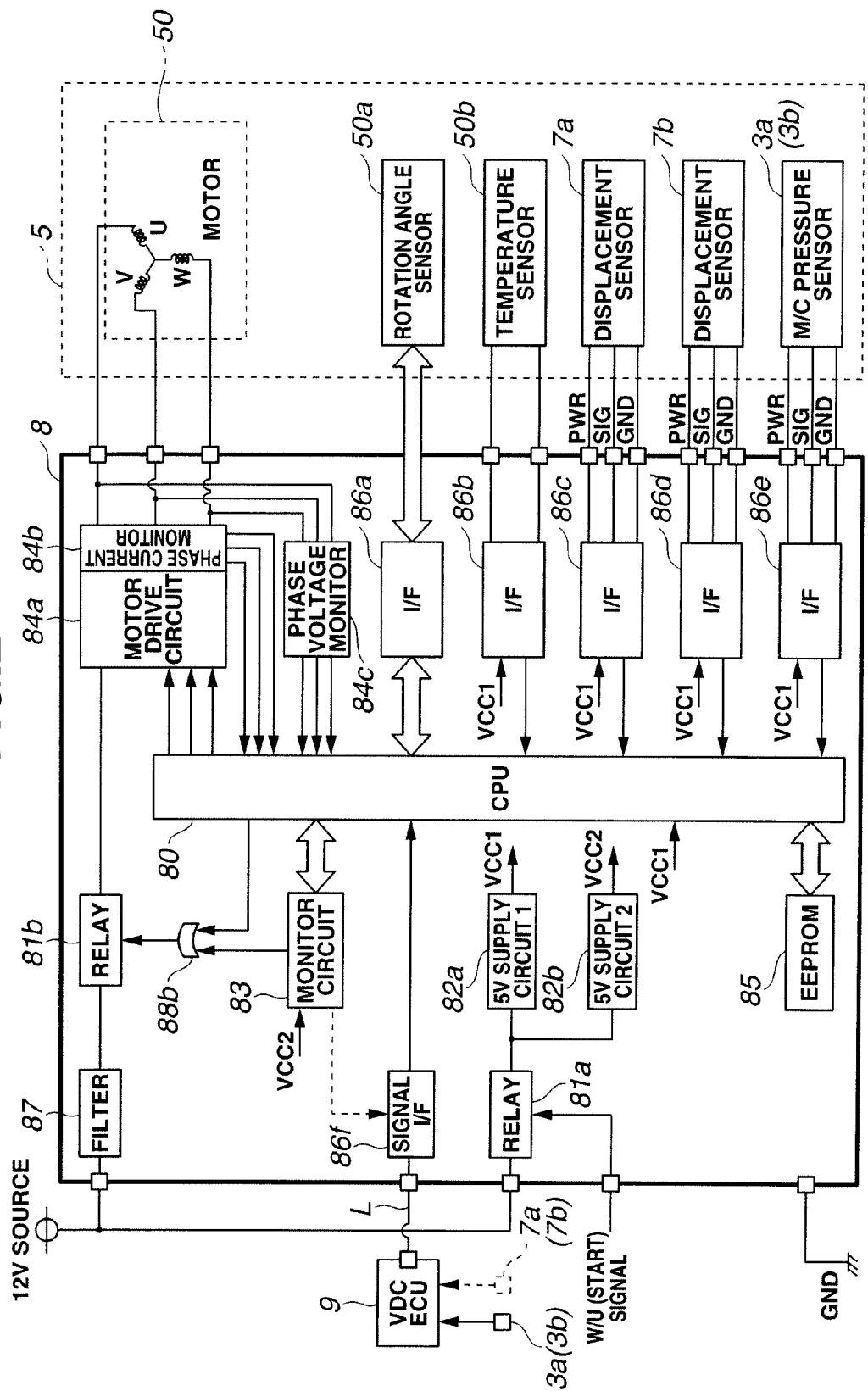
FIG. 2 is an electric circuit diagram showing a master pressure control section according to the first embodiment.

FIG. 2 shows the electric circuit configuration of master pressure control section 8 employed in this example. The electric circuit of master pressure control section 8 is shown by a block of solid line, and the electric circuit of master pressure regulating section 5 is shown by a broken line block. A block 9 of FIG. 2 shows (the electric circuit of) wheel pressure control section 9. In this example, the wheel pressure control section 9 includes an ECU for VDC etc.

VDC stands for vehicle dynamics control. For example, a VDC system is arranged to sense a vehicle attitude or behavior with one or more sensors, to apply the brake automatically to the front wheel on the outer side of a corner in the case of judgment of oversteer, and to perform an automatic control operation to decrease the engine power and at the same time to apply the brake to the rear wheel on the inner side of the corner in the case of judgment of understeer.

The electric circuit of master pressure control section 8 includes a central processing unit (CPU) 80, relay circuits 81*a* and 81*b*, 5V supply circuits 82*a* and 82*b*, a monitor control circuit 83, a three-phase motor drive circuit 84*a*, a phase current monitor circuit 84*b*, a phase voltage monitor circuit 84*c*, a memory circuit 85, and interface (I/F) circuits 86*a*~86*f*.

From a power source line in a vehicle, 12 V source power is supplied through an ECU power source relay circuit 81*a* to master pressure control section 8. The supplied 12V power is inputted to 5V supply circuits 82*a* and 82*b* which produce stable 5V source powers (Vcc1 and Vcc2), respectively. Vcc1 is supplied to CPU 80, temperature sensor I/F circuit 86*b*, displacement sensor I/F circuits 86*c* and 86*d*, master pressure sensor I/F circuit 86*e*, while Vcc2 is supplied to monitor control circuit 83.

ECU power source relay circuit 81*a* turns on in response to a W/U (start) signal inputted from an external device. It is possible to use, as the start signal, a door switch signal, a brake switch signal and/or an ignition (IGN) switch signal. When two or more of these signals are used, the ECU source relay circuit 81*a* is arranged to turn on when one of the input switch signals becomes ON.

The 12V source power from the source line of the vehicle is further supplied through filter circuit 87 for removing noises and failsafe relay circuit 81*b*, to the three-phase motor drive circuit 84*a*. Failsafe relay circuit 81*b* is arranged to make and break the connection between the above-mentioned supply line and the motor drive circuit 84*a*, and connected with CPU 80 and monitor control circuit 83 so that the on/off state of failsafe relay circuit 81*b* is controlled by CPU 80 and monitor control circuit 83. An on/off signal outputting section (or gate circuit) 88*b* is configured to turn off the failsafe relay circuit 81*b* to cut off the power supply to motor drive circuit 84*a* if an off command is inputted from CPU 80 or monitor control circuit 83.

CPU 80 is connected with wheel pressure control section 9 by a signal line (or communication line) L and signal I/F circuit 86*f*. Moreover, CPU 80 is connected with various sensors provided on the part of master pressure regulating section 5. In the example shown in FIG. 2, these sensors are: motor rotation angle sensor 50*a*, motor temperature sensor 50*b*, displacement sensors 7*a* and 7*b* and master pressure sensors 3*a* and 3*b*. The signals from these sensors are input to CPU 80, respectively, through rotation angle I/F circuit 86*a*, temperature sensor I/F circuit 86*b*, displacement sensor I/F circuits 86*c* and 86*d* and master pressure sensor I/F circuit 86*e*. Thus, CPU 80 of master pressure control section 8 is connected with a CPU of wheel pressure control section 9 by a communicating section including one signal line L, at least.

The signals inputted from master pressure sensors 3*a* and 3*b* are used to compare the sensed actual master pressure Pmc with the target master pressure in the above-mentioned variable boost control mode based on the relative displacement quantity Δx.

CPU 80 controls the drive motor 50 by sending one or more signals to motor drive circuit 84*a* in accordance with signals supplied from the external control unit and sensors. For the three phases of three phase motor 50, there are provided phase current monitor circuit 84*b* and phase voltage monitor circuit 84*c* for monitoring the current and voltage of each phase. CPU 80 receives the sensed phase currents and voltages, and operate the three phase motor drive circuit 84*a* optimally in accordance with the monitored conditions.

Thus, CPU 80 collects input information on the current conditions of master pressure regulating section 5, and controls (the drive motor 50 of) master pressure regulating section 5 in accordance with the input information. Moreover, CPU 80 is configured to detect or judge a failure in master pressure regulating section 5 when the monitored operating condition of the section 5 is out of a predetermined normal range, and when motor 50 is not controlled as commanded by the control command.

Monitor control circuit 83 is connected with CPU 80 to send and receive signals to and from CPU 80, and configured to monitor the conditions of CPU 80 and 5V supply circuit 82*a* to detect a failure of CPU 70, an abnormal condition of Vcc1, and an abnormal condition of 5V supply circuit 82*a*. When a failure or an abnormal condition is detected, the monitor control circuit 83 immediately delivers an off command signal to failsafe relay circuit 81*b*, and thereby shuts off the supply of electric power to motor drive circuit 84*a* by turning off the failsafe relay circuit 81*b*.

CPU 80 monitors the operating conditions of monitor control circuit 83 and 5V supply circuit 82*b* as the power source for monitor control circuit 83, to detect a failure in monitor control circuit 83, an abnormal condition of supply circuit 82*b* and an abnormal condition of Vcc2.

Memory circuit 85 of this example includes a nonvolatile member connected with CPU 80 and arranged to store various information such as information on failure. The nonvolatile memory is EEPROM in the example shown in FIG. 2. CPU 80 stores, in memory circuit 85, information on a detected failure, and values such as learning values (control gain, offset values of various sensors, for example) used for the control of master pressure regulating mechanism 5.

A backup request signal is delivered through signal I/F circuit 86*f* and signal line L to wheel pressure control section 9 when a failure of master pressure regulating section 5 is detected by CPU 80, or a failure in CPU is detected by monitor control circuit 83 or when there occurs a breakage of signal line L or a short-circuit. In response to this backup request signal, the wheel pressure control section 9 changes over the control to a backup control mode, and performs the backup control.

As the signal delivered from signal I/F circuit 86*f* to wheel pressure control section 9, it is possible to employ various forms (such as a two-value signal having two signal levels, or a periodical signal). For example, the signal outputted from signal I/F circuit 86*f* may be in the form of a signal which is held at a high level in a normal state, and at a low level in the case of a failure being detected; a clock signal or periodical signal which alternates between the high and low levels at regular intervals in the case of the normal state, and which is fixed at the high or low level in the case of a failure, or a clock or periodical signal whose period is changed when a failure is detected. Accordingly, the backup request signal may be in the form of a change in a signal waveform or a signal condition, such as a change in the signal level or a change in the period or frequency, of the signal delivered to wheel pressure control unit 9.

In this example, the signal I/F circuit 86*f* delivers the backup request signal in the form of change in the signal waveform in the case of a failure in CPU 80, a breakage of signal line L or a short-circuit, too. Furthermore, in addition to the above-mentioned configuration, it is optional to employ the arrangement in which monitor control circuit 83 is connected with signal I/F circuit 86*f* as shown by a broken line arrow in FIG. 2, and configured to change the signal waveform of I/F circuit 86*f* by sending a signal to I/F circuit 86*f* when a failure is detected in CPU 80.

Figure 3:
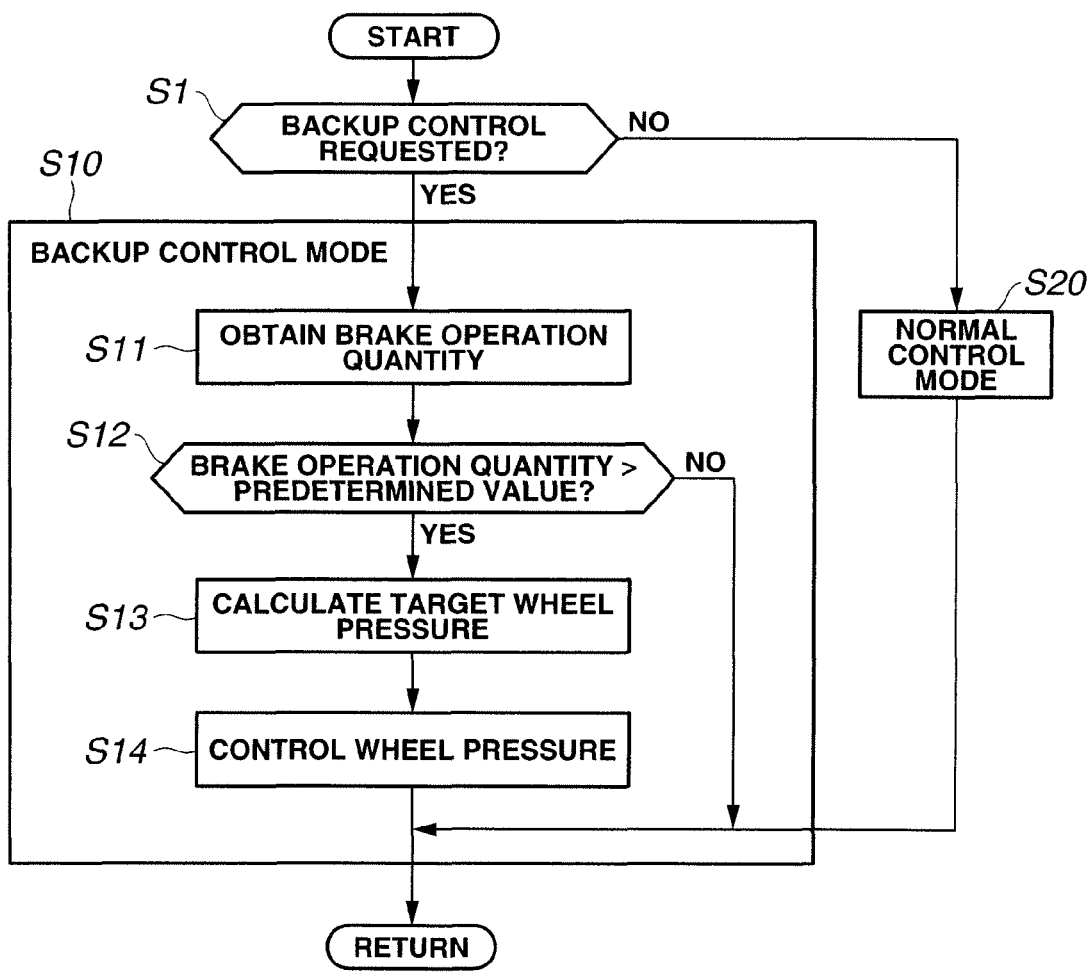
FIG. 3 is a flowchart showing a process of a backup control of a wheel cylinder control section.

Upon receipt of the backup request signal from master pressure control section 8, the wheel pressure control section 9 performs the following control. FIG. 3 shows, as an example, a flowchart of the control process performed by wheel pressure control section 9.

At a step S1, wheel pressure control section 9 examines whether the backup control request from master pressure control section 8 is present or absent, by checking the electric signal of signal line L (that is, the backup request signal). When there is no backup request, wheel pressure control section 9 proceeds to a step S20 for a normal control mode, and performs operations in the normal control mode. In the normal control mode of S20, the wheel pressure control section 9 continues its function in a conventional or ordinary manner, without performing the backup control.

When the backup request is present, wheel pressure control section 9 proceeds from S1 to a step S10 (S11~S14) for a backup control mode. In the backup control mode, control section 9 first ascertains a brake operation quantity at a step S11. In this example, the brake operation quantity is determined in accordance with the signal (master pressure Pmc) from the master pressure sensor (3*a*, 3*b*).

Instead of using master pressure Pmc, it is possible to determine the brake operation quantity in various manners. For example, the signal (represent the displacement of input rod 6) of brake operation sensing device 7 is supplied, directly or through signal line L, to wheel pressure control section 9. In another example, there is provided a pedal force sensor for sensing a force applied on brake pedal BP, and the signal of the pedal force sensor is inputted to wheel pressure control section 9. Moreover, it is possible to determine the brake operation quantity by using any two or more of the master pressure Pmc, the displacement of input rod 6 and the brake pedal force.

At a step S12 following S11, control section 9 checks the presence or absence of a driver's brake operation by using the sensed brake operation quantity. In this example, control section 9 compares the sensed brake operation quantity with a predetermined value. When the sensed brake operation quantity is smaller than or equal to the predetermined value which is a minimum setting value (such as zero), the control section 9 judges that the driver does not perform a brake operation, and hence does not perform the boost control to increase the wheel pressure Pwc (by skipping S13 and S14).

When the sensed brake operation quantity is greater than the predetermined value: control section 9 judges that the brake pedal is depressed by the driver and hence the brake operation is performed by the driver; proceeds from S12 to a step S13, and calculates the target wheel pressure Pwc* in accordance with the brake operation quantity.

Then, at a step S14, control section 9 performs the boost control to increase the wheel pressure Pwc by controlling the inner gate valves 17 and 27, outer gate valves 11 and 21 and the motor M (for pump P) in accordance with target wheel pressure Pwc*.

In the backup control mode of S12, wheel pressure control section 9 checks the brake operation quantity, and controls the braking force so that a braking force is not produced in the absence of a brake operation, and a braking force is produced immediately in response to a driver's brake operation.

Figure 4:
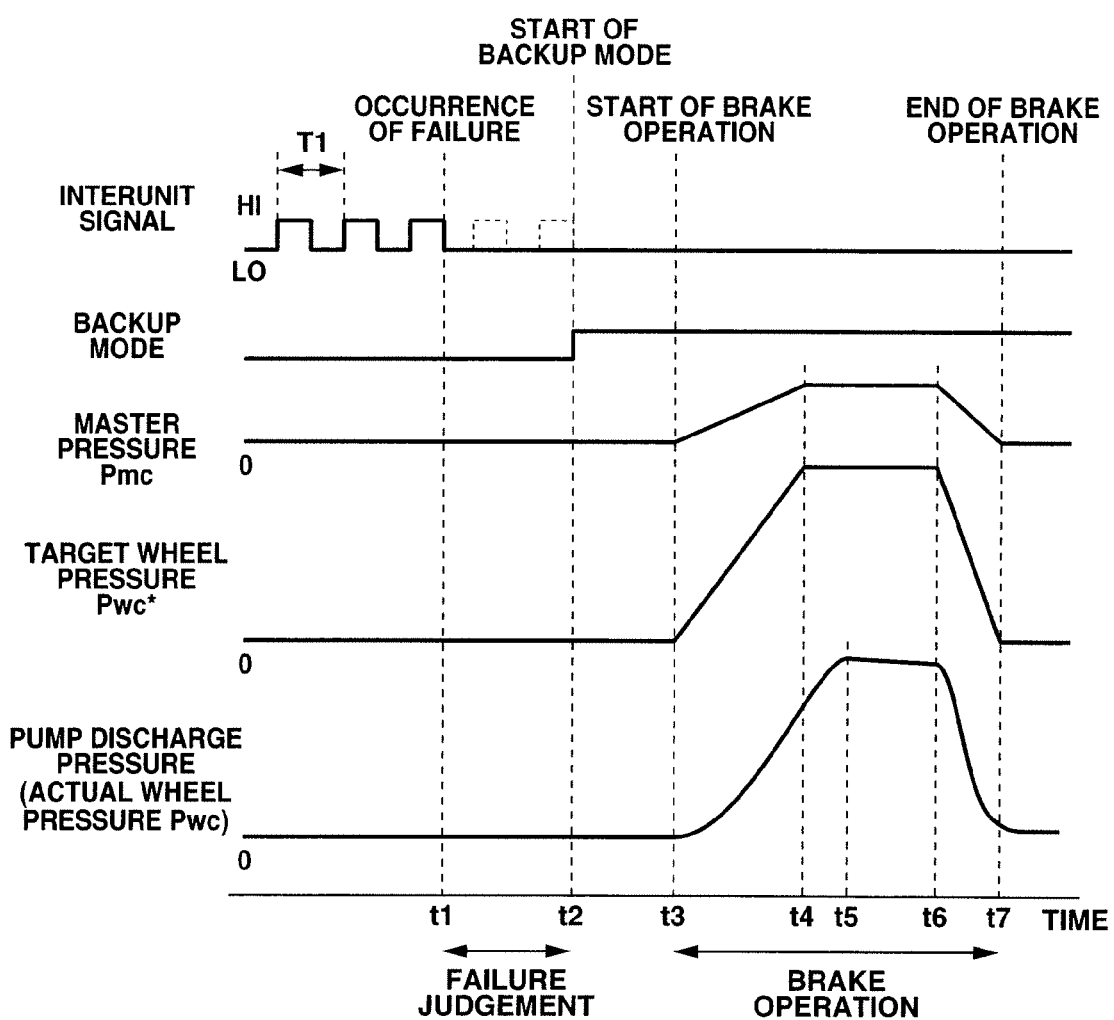
FIG. 4 is a time chart illustrating time variation of a braking force in the backup control started in response to a change in an inter-unit signal in one example (change to an L0 level).
Figure 5:
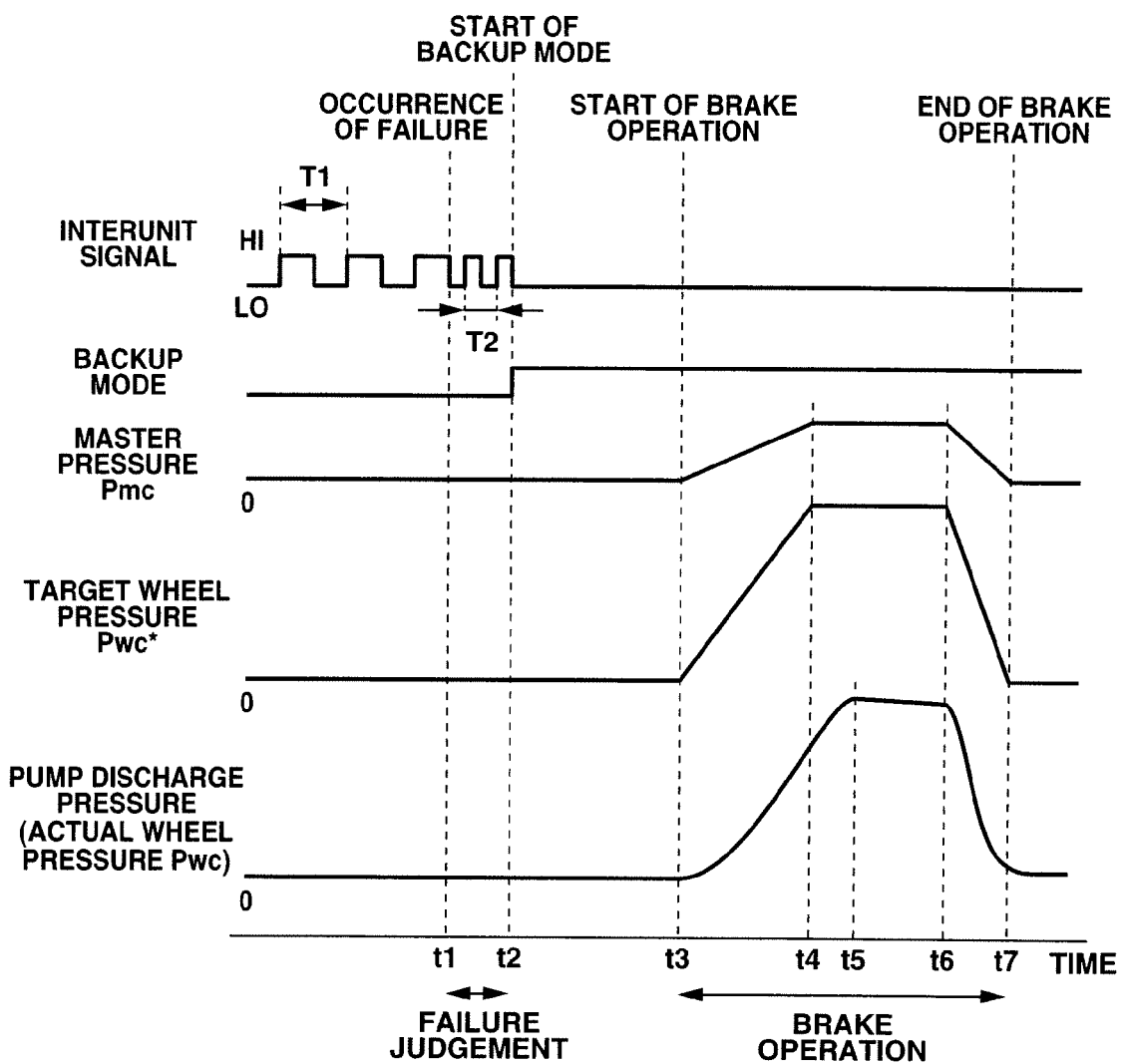
FIG. 5 is a time chart illustrating time variation of the braking force in the backup control started in response to a change in the inter-unit signal in another example (change to a shorter period).

FIGS. 4 and 5 show operations in the backup control mode at the time of occurrence of a failure in the form of time chart showing time variation of the inter-unit signal (the electric signal sent from signal I/F circuit 86f through signal line L), backup request signal, master pressure Pmc, target wheel pressure Pwc* and pump discharge pressure (actual wheel pressure Pwc).

In the normal state of master pressure regulating section 5 and master pressure control section 8, the inter-unit signal is in the form of periodical rectangular signal (clock signal) alternating between HI level and LO level with a constant period T1 in both of FIG. 4 and FIG. 5. In the example of FIG. 4, the inter-unit signal is changed to a constant signal at the LO level when a failure is directed at an instant t1. In the example of FIG. 5, the period T of the inter-unit signal is changed from T1 to a smaller value T2 (<T1) at the time point t1 of occurrence of a failure. In these examples, wheel pressure control section 9 checks the inter-unit signal two or more times, and changes the control to the backup control mode on the assumption that the backup request signal is produced when the abnormal condition of the inter-unit signal is ascertained a plurality of times. The following explanation is directed to FIG. 4 as an example.

In FIG. 4, until t1, the normal state continues, and the inter-unit signal remains in the normal form. Since there is no brake operation, the master pressure Pmc remains zero. Wheel pressure control section 9 is held in the normal control mode because the inter-unit signal is in the normal form. Furthermore, target wheel pressure Pwc* is zero, and the pump outlet pressure (wheel pressure Pwc) is zero.

At instant t1, master pressure control section 8 detects a failure, and fixes the inter-unit signal constant at the level of LO. Wheel pressure control section 9 receives this inter-unit signal from master pressure control section 8, and checks the absence of the rectangular pulse of HI level. When wheel pressure control section 9 fails to detect a rectangular pulse of HI level twice consecutively, and thereby detects the abnormal condition represented by the lack of the HI level pulse in two consecutive periods of the inter-unit signal, then the wheel pressure control section 9 judges at an instant t2 that the backup request is produced, and starts the backup control mode from t2. The time interval from t1 to t2 is a time for judging a failure.

Even after the start of the backup control mode at t2, the master pressure Pmc, target wheel pressure Pwc and actual wheel pressure Pwc (pump discharge pressure) all remain zero until an instant t3 because there is no brake operation.

At instant t3, brake pedal BP is depressed and a brake operation is started. Therefore, the master pressure Pmc increases at a constant rate in accordance with the brake operation from t3 to an instant t4. Since the brake operation is performed during the period of the backup control mode, the wheel pressure control section 9 calculates the target wheel pressure Pwc* from the brake operation quantity (master pressure Pmc), and control the wheel pressure regulating section 3 inclusive of pump P so as to bring the actual wheel pressure Pwc to the target wheel pressure Pwc*. Therefore, as shown in FIG. 4, the target wheel pressure Pwc* increases at a constant rate, and the pump discharge pressure (actual wheel pressure Pwc) increases following target wheel pressure Pwc*.

The brake operation quantity (master pressure Pmc) stops increasing at an instant t4, and remains constant until an instant t6, so that the calculated target wheel speed Pwc* remains constant from t4 to t6. The pump discharge pressure (wheel pressure Pwc) becomes constant at a level corresponding to target wheel pressure Pwc* from an instant t5 slightly delayed after t4, and remains constant until t6.

At instant t6, the brake operation quantity (master pressure Pmc) starts decreasing at a constant rate. At an instant t7, the brake operation quantity becomes equal to zero and the brake operation ends. Accordingly, the target wheel pressure Pwc* is decreased at a constant rate, and the pump discharge pressure decreases following the target wheel pressure Pwc*. After t7, target wheel pressure Pwc* and pump discharge pressure (Pwc) become equal to zero.

In the case of FIG. 5, master pressure control section 8 detects a failure at t1, and changes the period of the inter-unit signal from T1 to T2 at instant t1 of detection of failure. Wheel pressure control section 9 checks the decreased period T2 of the inter-unit signal twice, and thereby detects the abnormal condition in two consecutive periods of the inter-unit signal, then wheel pressure control section 9 judges at an instant t2 that the backup request is produced, and starts the backup control mode at t2. The time interval from t1 to t2 is a time for judging a failure. As shown in FIG. 5, it is possible to employ the configuration that a command signal is delivered to the signal I/F circuit 86f of master pressure control section 8 through signal line L when wheel pressure control section 9 is turned over to the backup control mode, and the signal I/F circuit 86f stops producing the inter-unit at t2 in response to this command signal. In other respects, the operations in FIG. 5 are substantially identical to those in FIG. 4.

In this way, wheel pressure control section 9 can remain inoperative without producing a braking force after the time t2 of changeover to the backup mode as long as there is no braking operation (t2~t3), and can produce the braking force corresponding to the brake operation immediately by controlling the wheel pressure Pwc when a brake operation is started (t3~t7).

The brake control apparatus according to the first embodiment can provide the following effects, for example.

(1) A brake control apparatus according to the first embodiment comprises at least a controlling section comprising: a first (boost) controller to control a brake booster to assist operation of a master cylinder to increase the master cylinder pressure; a second controller to control a hydraulic modulator including a pressure source to increase a wheel cylinder pressure; and a communicating section to connect the first controller and the second controller. According to the first embodiment: the brake booster includes master pressure regulating mechanism 5 connected with master cylinder 2;

the hydraulic modulator includes wheel pressure regulating mechanism 3 connected with the master cylinder 2 to receive the master cylinder pressure (Pmc) and connected with a wheel cylinder to supply the wheel cylinder pressure (Pwc) to the wheel cylinder; the first controller includes master pressure control section 8, the second controller includes wheel pressure control section 9; and the communicating section includes the communication or signal line (L).

Therefore, the brake control apparatus can always deliver a signal or information on a condition of a boost system formed by the booster (5) and the first controller (8) through communication line (L). Therefore, the brake control apparatus can detect and judge an abnormal condition of the boost system in advance, without the need for judging the failure at the time of a next brake operation, and eliminate a time during which the brake control apparatus is unable to perform the boost function. As a result, as shown in FIGS. 4 and 5, the brake control apparatus can increase the braking force quickly in response to a start of a driver's brake operation, thereby restrain deterioration in the response speed, and improve the safety.

(2) The brake control apparatus according to the first embodiment may further comprise a booster condition transmitting section to transmit, through the communicating section, a condition of the boost system or a condition of the booster (5) or the first controller (8). In the example shown in FIG. 2, the booster condition transmitting section includes signal I/F circuit 86*f* which transmit, through the communicating section to the second controller, the condition of the boost system both when the booster (5) is in an operative state and when the booster (5) is in an inoperative state while the first and second controllers are in the on state.

With the booster condition transmitting section producing a signal representing the condition of the boost system always while the first and second controllers (8, 9) are on, the brake control apparatus can provide the above-mentioned effect (1) securely.

(3) The booster condition transmitting section (86*f*) is provided in the first controller (8), the first controller (8) transmits a condition signal representing a failure, as the booster condition of the booster system (5, 8), through the communication line (L) to the second controller (9), and the second controller (9) performs a boost backup control (S10) to increase the wheel cylinder pressure by controlling the hydraulic modulator (3) in response to the condition signal representing the failure.

Therefore, the brake control apparatus can provide an effect similar to the effect (2). Furthermore, as compared to the configuration in which the booster condition transmitting section is provided in the second controller (9), the brake control apparatus can detect a failure in the boost system more quickly and the first controller (8) can start a failsafe operation more quickly and responsively.

It is optional to employ the configuration in which the booster condition transmitting section (86*f*) is provided in the second controller (9), and arranged to transmit a condition signal on the condition of the booster (5), from the second controller (9) to the first controller (8). In this case, for example, the second controller (9) is arranged to receive the target master pressure (Pmc*) from the first controller (8) and the actual master pressure (Pmc) sensed by a master pressure sensor (3*a*, 3*b*), and examines the presence or absence of a failure in the booster (5) by comparing the actual master pressure with the target master pressure. When a failure is detected, the condition signal indicating the occurrence of a failure is transmitted through communication line L to the first controller. The first controller (8) performs a failsafe operation in response to the condition signal indicating the presence of a failure in the booster while the second controller (9) performs a backup control operation.

Furthermore, it is optional to provide a third controller, such as an integrated control unit, which is disposed at an intermediate point in communication line L between the first and second controllers, and which is configured to transmit a condition of the booster and/or a condition of the first controller, from the third controller through the communication line.

(4) At least one of the first and second controllers (8, 9) includes a nonvolatile memory (85) retaining information on a failure in the boost control system during a brake operation period during which a brake operation is performed and during a brake inoperative period during which no brake operation is performed. In the example shown in FIG. 2, the first controller (8) include memory circuit 85 connected with CPU 80 and arranged to store information on a failure not only in the brake operation period but also the brake inoperative period and to enable transmission of the information on the failure to the second controller even during the brake inoperative period. It is possible to provide such a nonvolatile memory in either or both of the first and second controllers. With the nonvolatile memory, the brake control apparatus can provide the above-mentioned effects (2) and (3) securely.

(5) In the backup control, the second controller (9) controls the hydraulic modulator (3) in accordance with a brake operation quantity sensed by a brake operation sensor (7). Therefore, the brake control apparatus can refrain from producing a braking force when there is no driver's brake operation, and produce the braking force (for the boost backup) immediately by controlling the hydraulic modulator in accordance with the brake operation quantity when the driver performs a brake operation by depressing the brake pedal. Therefore, the brake control apparatus can provide the above-mentioned effects (2) and (3).

(6) The brake operation quantity sensor may include at least one of a brake pedal force sensor to sense a depression force applied on a brake pedal, a brake pedal stroke sensor or brake pedal position sensor to sense a movement of the brake pedal, and a master cylinder pressure sensor to sense a master cylinder pressure of the master cylinder. In the backup control, the brake operation quantity is sensed from the sensed master pressure (Pmc). As another means for sensing the brake operation quantity, it is optional to employ the arrangement in which the signal (displacement quantity of input rod 6) of the brake operation quantity sensor (7) is directly or through communication line (L) to the second controller (9). In this case, the brake control apparatus can detect a driver's brake operation quickly with the displacement (stroke) sensor. Moreover, it is optional to sense a brake pedal force applied by the driver to the brake pedal with a pedal force sensor. Furthermore, it is optional to employ any two or all three of the master pressure sensor, the stroke (position) sensor, and the pedal force sensor. In this case, it is possible to sense the brake operation quickly and securely and to improve the function of failsafe.

(7) The hydraulic modulator (3) shown in FIG. 1 includes at least the pressure source including a pump (P) to suck a brake fluid from the master cylinder; a first gate valve (such as outer gate valve 11 or 21) provided between the master cylinder (2) and the wheel cylinder (4*a*~4*d*); and a second gate valve (such as inner gate valve 17 or 27) provided between the master cylinder (2) and the pump (P); and the second controller (9) performs the backup control to increase the wheel cylinder pressure (Pwc) with the pump by producing a pump-up pressure. Therefore, the second controller (9) can perform the backup control by controlling the pump and the first and second gate valves of the hydraulic modulator (3).

The hydraulic modulator (3) may further include a pressure regulating section disposed between the first gate valve (11, 21) and the wheel cylinder and arranged to increase and decrease the wheel cylinder pressure of the wheel cylinder. The hydraulic modulator (3) may further comprise a downstream section (which may include a reservoir (16, 26)). The modulator (3) may further include a first connection point (or port) connected with the master cylinder and a second connection point (or port) connected with the wheel cylinder. The pressure regulating section may includes a pressure increase valve (12, 13, 22, 23) connected between a first junction point and a second junction point connected with the second connection point (or port) leading to the wheel cylinder, and a pressure decrease valve (14, 15, 24, 25) connected between the second junction point and the downstream section (16). The first gate valve (11, 21) is disposed between the first connection point (or port) and the first junction point while the second gate valve (17, 27) is connected between the first connection point (or port) and the downstream section. The pump includes an inlet side connected with the downstream section (16, 10$f$, 10$h$; 26, 20$f$, 20$h$) to suck the brake fluid from the downstream section, and an outlet side connected with the first junction point to discharge the brake fluid under pressure toward the pressure increase valve.

(8) The brake control apparatus detects an abnormal condition in communication through communication line (L), and the second controller (9) performs the boost backup control by controlling the hydraulic modulator (3) in the case of the abnormal condition in the communication through communication line (L). Even in case of wire breakage or short-circuit of the communication line (L), the signal I/F circuit 86$f$ changes the form of the (inter-unit) signal from a first signal form for the normal state to a second signal form (such as a form having a constant signal level) and thereby notify the second controller (9) of the occurrence of the abnormal condition of the communication line, and the second controller can perform the backup control.

Figure 6:
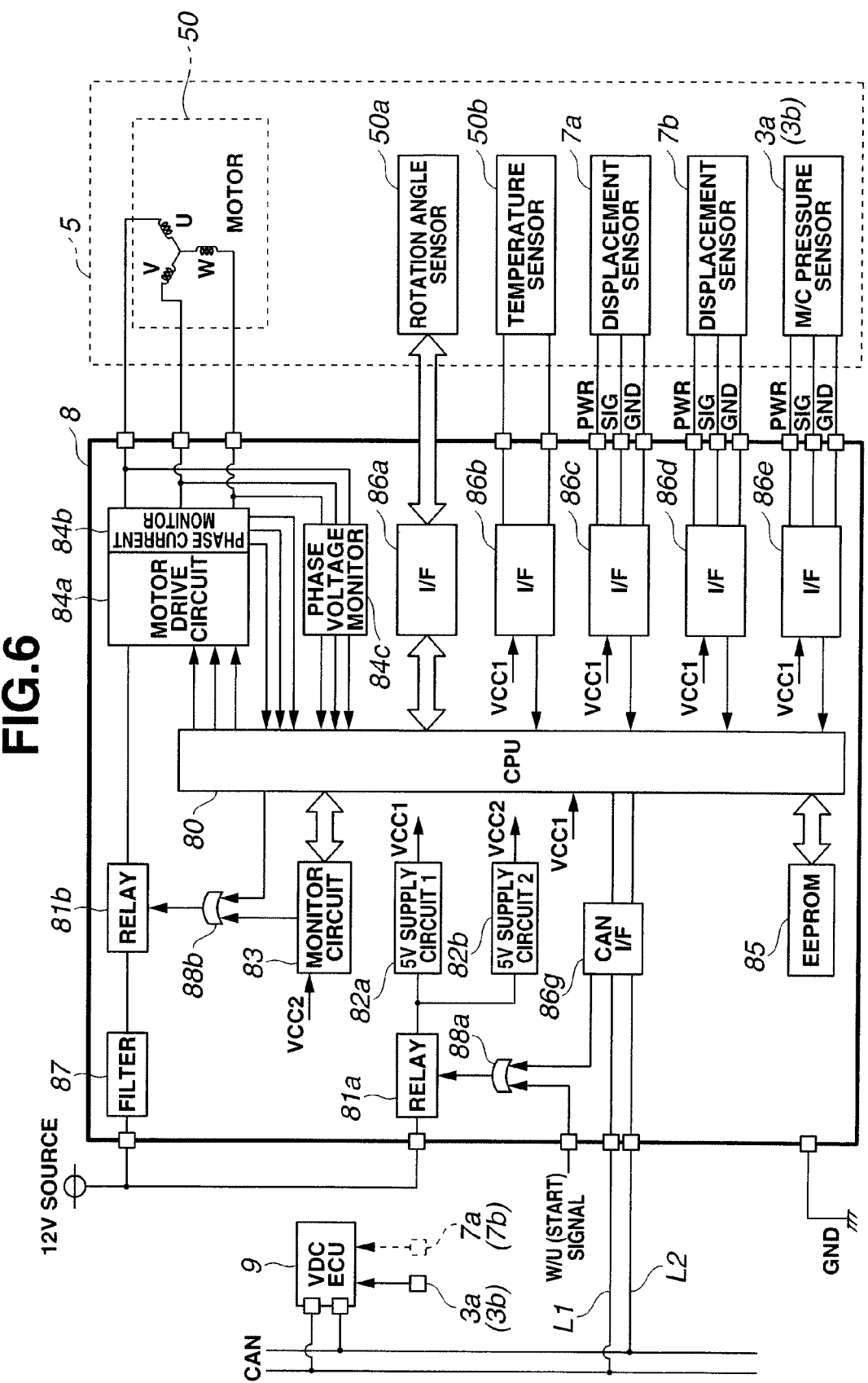
FIG. 6 is an electric circuit diagram showing a master pressure control section according to the second embodiment.

FIG. 6 shows an electric circuit configuration of the master pressure control section 8 according to a second embodiment of the present invention. The second embodiment is different, in the communication line L connecting master pressure control section 8 and wheel pressure control section 9, from the first embodiment. In the other respects, the second embodiment is substantially identical to the first embodiment, so that repetitive explanation is omitted by using the same reference numerals for the nondifferent parts.

As shown in FIG. 6, CPU 80 is connected, through signal lines L1 and L2 and a CAN communication I/F circuit 86$g$, with wheel pressure control section 9 and one or more other external control devices provided in the vehicle so that CPU 80 can communicate with these external devices bidirectionally. Through CAN communication I/F circuit 86$g$, CPU 80 receives information on vehicle operating conditions and a control signal from wheel pressure control section 9 and the other external devices.

ECU power source relay circuit 81$a$ turns on when the relay circuit 81$a$ receives, through a start signal gate circuit 88$a$, one of the W/U (start) signal inputted from an external device as in FIG. 2, and a start signal produced by CAN communication I/F circuit 86$g$ in accordance with information received by CAN communication. When a failure is detected in master cylinder regulating section 5 or CPU 80, a backup request signal is delivered through CAN communication I/F circuit 86$g$, to wheel pressure control section 9.

In the brake control system including the communication section shown in FIG. 6, master pressure control section 8 can achieve the variable boost control and the automatic brake control in cooperation with an external control device by receiving vehicle information and a control signal from the external control device, and sending the master pressure Pmc produced by master pressure regulating section 5 or the braking force, to the external control device.

In the case of the automatic brake control in which there is no brake operation of the driver (input rod 6 is not moved), the brake control system can perform an automatic brake control operation to produce the master pressure Pmc automatically with the master pressure regulating mechanism 5 and master pressure control section 8. This automatic brake control operation is a control operation of moving primary piston 2$b$ forward and rearward to regulate the operating pressure of master cylinder 2 to a requested pressure of the automatic brake control (automatic brake requested pressure). This automatic brake control operation can be used for controlling the brake system of a vehicle automatically in various vehicle controls such as vehicle following control, lane departure preventing control, and obstacle avoiding control. The automatic brake requested pressure can be calculated from a desired target braking force outputted from a controller of one of the above-mentioned vehicle control systems, for example.

In this case, it is possible to employ, as a method of controlling primary piston 2$b$, a method of obtaining a value of displacement quantity xPP of primary piston 2$a$ to achieve the automatic brake requested pressure from a table representing a preliminarily prepared relationship between the displacement quantity xPP of primary piston 2$b$ and master pressure Pmc, and setting the obtained value of the displacement quantity xPP as the target displacement quantity. In this control method, the motor rotation angle sensed by motor rotation angle sensor 50$a$ is converted to the displacement quantity xPP of primary piston 2$b$, and the drive motor 50 is controlled in the feedback control mode so as to control the thus-determined displacement quantity to the above-mentioned target displacement quantity.

Another control method is a feedback control method of controlling the displacement quantity xPP of primary piston 2$b$ so as to control the actual master pressure Pmc sensed by the master pressure sensor (3$a$, 3$b$) to the automatic brake requested pressure. It is possible to employ any of these control methods. It is further possible to receive the automatic brake requested brake pressure from an external control system.

The above-mentioned automatic brake control method using the table is not directly based on the sensed master pressure Pmc. Therefore, in order to check whether the master pressure is correctly produced to the intended level of the automatic brake requested pressure, the brake system can perform a failsafe operation by comparing the additionally sensed master pressure Pmc with the automatic brake requested pressure.

The control flow of wheel pressure control section 9 according to the second embodiment is substantially identical to the flow of the first embodiment shown in FIG. 3 except that step S1 checks the presence or absence of the backup request signal by receiving the signal from master pressure control section 8 through the CAN communication.

Wheel pressure control section 9 judges that the backup request is produced when the CAN communication becomes impossible with master pressure control section 8. In the case of a (total) failure in CPU 80 or an interruption of the supply of VVC1 for CPU 80, the above-mentioned CAN communication always performed periodically between master pressure control section 8 and wheel pressure control section 9 becomes unfeasible, and the control system can detect such a failure by a change of the form of the inter-unit signal (to the signal fixed constantly at the L0 level, for example).

In the case of undesired interruption of the CAN communication, CPU 80, at its end too, detects the interruption of CAN communication, and stops the master pressure control, to prevent simultaneous control both in master pressure control section 8 and wheel pressure control section 9. When the CAN communication becomes unfeasible because of breakage of one of the signal lines L1 and L2 or failure of the CAN communication I/F circuit 86g, for example, the master pressure control of master pressure control unit 8 is still possible, and there is the need for preventing the simultaneous control by control sections 8 and 9.

When wheel pressure control section 9 proceeds to S10 of the backup control mode, the wheel pressure control section 9 detects a brake operation quantity from a signal from the master pressure sensor (3a, 3b) at S11; and controls the wheel pressure Pwc (for the boost control) by controlling the inner gate valves 17 and 27, outer gate valves 11 and 21 and the motor M (for pump P) at S13 and S14. Step S11 may be arranged to detect the brake operation quantity by using the signal of brake operation sensing device 7 (displacement sensors 7a and 7b) received through the CAN communication from master pressure control section 8.

Instead of CAN communication, it is possible to use serial communication (other than CAN communication) or FlexRay communication. The FlexRay communication is one of automotive (or in-car) LAN interface protocols, and the reliability of data transmission is enhanced as compared to CAN. In this case, the CAN communication I/F circuit 86g is replaced by a serial communication I/F circuit or a flexray communication I/F circuit, to enable communication between control sections 8 and 9 through the communication line or bus. When a failure is detected by master pressure control section 8, the backup request signal is transmitted to wheel pressure control section 9 through the communication.

Since the communication becomes unfeasible in case of (total) failure of CPU 80, and breakage or short-circuit of the communication line L1, L2, the wheel pressure control section 9 changes the control mode to the backup control mode in case of reception of the backup request signal or interruption of the communication (detected by the signal waveform change to the constant waveform of L0 level, for example).

The thus-constructed brake control system can change over wheel cylinder control section 9 to the backup control mode in the event of occurrence of a failure in the boost system during the brake inoperative period during which a brake operation is not performed by the driver, and can start the wheel pressure control immediately in response to a driver's brake operation, to produce a braking force in accordance with the brake operation quantity.

The brake control system according to the second embodiment can provide the following effects.

(9) The booster condition transmitting section (86g) is provided in the first control unit or controller (8), the first control unit (8) transmits a condition signal representing a failure, as the booster condition of the booster system, through the CAN communication (or other serial communication or flexray communication) to the second control unit or controller (9), and the second control unit performs the boost backup control to increase the wheel cylinder pressure by controlling the modulator (3) in response to the condition signal signaling the occurrence of a failure.

By using the CAN communication line (or other serial communication line or flexray communication line), the brake control system can provide effect similar to the beforementioned effect (3). In the absence of a failure in the boost system (5, 8), the brake control system can performs the variable boost control and/or the automatic brake control in cooperation with an external control device.

Figure 7:
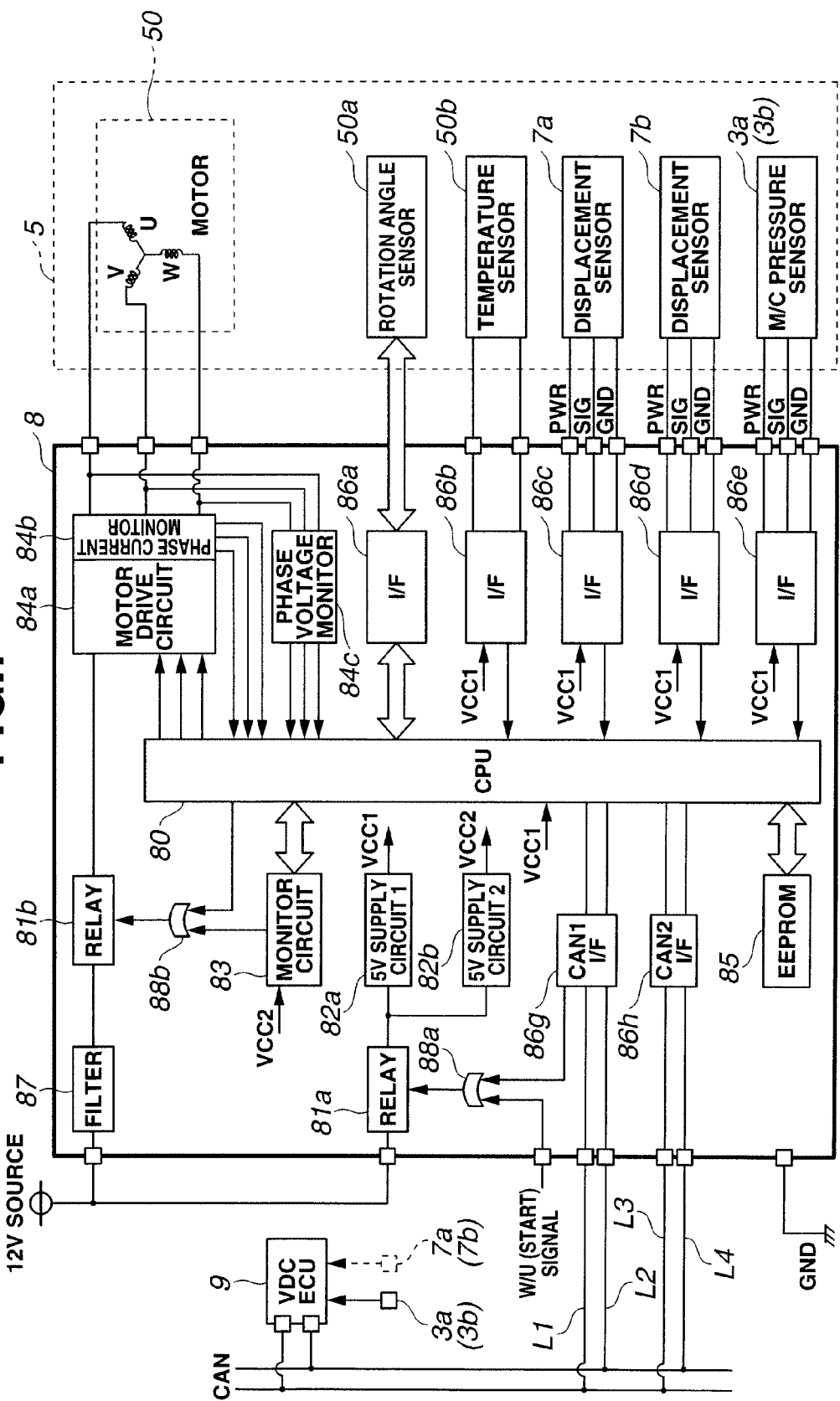
FIG. 7 is an electric circuit diagram showing a master pressure control section according to the third embodiment.

FIG. 7 shows the electric circuit configuration of master pressure control section 8 according to a third embodiment of the present invention. The third embodiment is different from the second embodiment in that there are provided a plurality of sets of communication lines. In the example of FIG. 7, in addition to signal lines L1 and L2 connected to CAN communication I/F circuit 86g, there are further provided a second CAN communication I/F circuit 86h, and a second set of signal lines L3 and L4 which are connected with I/F circuit 86h. The second set of signal lines L3 and L4 and second I/F circuit 86h can be used substantially in the same manner as the first set of signal lines L1 and L2 and the first CAN communication I/F circuit 86g. Each of signal lines L1~L4 can be used in the same manner as the signal line L shown in FIG. 2 according to the first embodiment. In the other respects, the construction of the third embodiment is substantially identical to that of the second embodiment.

As shown in FIG. 7, master pressure control section 8 includes a plurality (two) of CAN communication I/F circuits (86g and 86h) connected, respectively, with a plurality (two) of sets of signal lines (L1 and L2, L3 and L4) whereas wheel pressure control section 9 is connected with only one set of the signal lines as in the example of FIG. 6. Therefore, wheel pressure control section 9 need not have a plurality of CAN communication I/F circuits. However, wheel pressure control section 9, too, may be provided with a plurality of CAN communication I/F circuits connected with a plurality of sets of signal lines. Moreover, it is optional to provide three or more sets of signal lines. As in the second embodiment, it is possible to employ communication line or lines and I/F circuit or circuits for the serial communication of other types or the flexray communication, instead of the CAN communication.

The control flow for the third embodiment is substantially identical to that of the second embodiment (FIG. 3). At S1, wheel pressure control section 9 can judge that the backup control request is produced when the backup request signal is received (in the form of a change in the signal form or in the form of incapability of communication) through either or both of the first set of signal lines L1 and L2 and the second set of signal lines L3 and L4, for example.

Even if the communication through one set of signal lines becomes abnormal because of breakage of a wire, a failure in I/F circuits or some other factor, the brake control system can continue the CAN communication through another set of signal lines. Moreover, in this case, the master pressure control section 8 can still perform the master pressure control. Therefore, unlike the second embodiment, master pressure control section 8 of the third embodiment can continue the master pressure control without sending the backup request signal to wheel pressure control section 9 when a failure in one of the communication line sets is detected. In this case, the brake control system can continue the primary master pressure control with master pressure control section 8 and master pressure regulating section 5, instead of resorting to the backup control of wheel pressure control section 9 and wheel pressure regulating section 3.

(10) The third embodiment can provide the following effect. The brake control apparatus includes a plurality of communication systems (each of which may include at least one communication line (and at least one I/F circuit in each of the control units (8, 9)). When one of the communication systems becomes abnormal, the brake control apparatus can continue the primary boost control with the first control unit (8) and the brake booster (5). Therefore, in addition to effects similar to the before-mentioned effects (2), (3) and (9), the third embodiment can improve the reliability of the failsafe function by continuing the primary boost control of the first control unit (8) and booster (5), instead of the backup control of the second control unit (9) and hydraulic modulator (3), in case of a failure in one of the communication systems.

Figure 8:
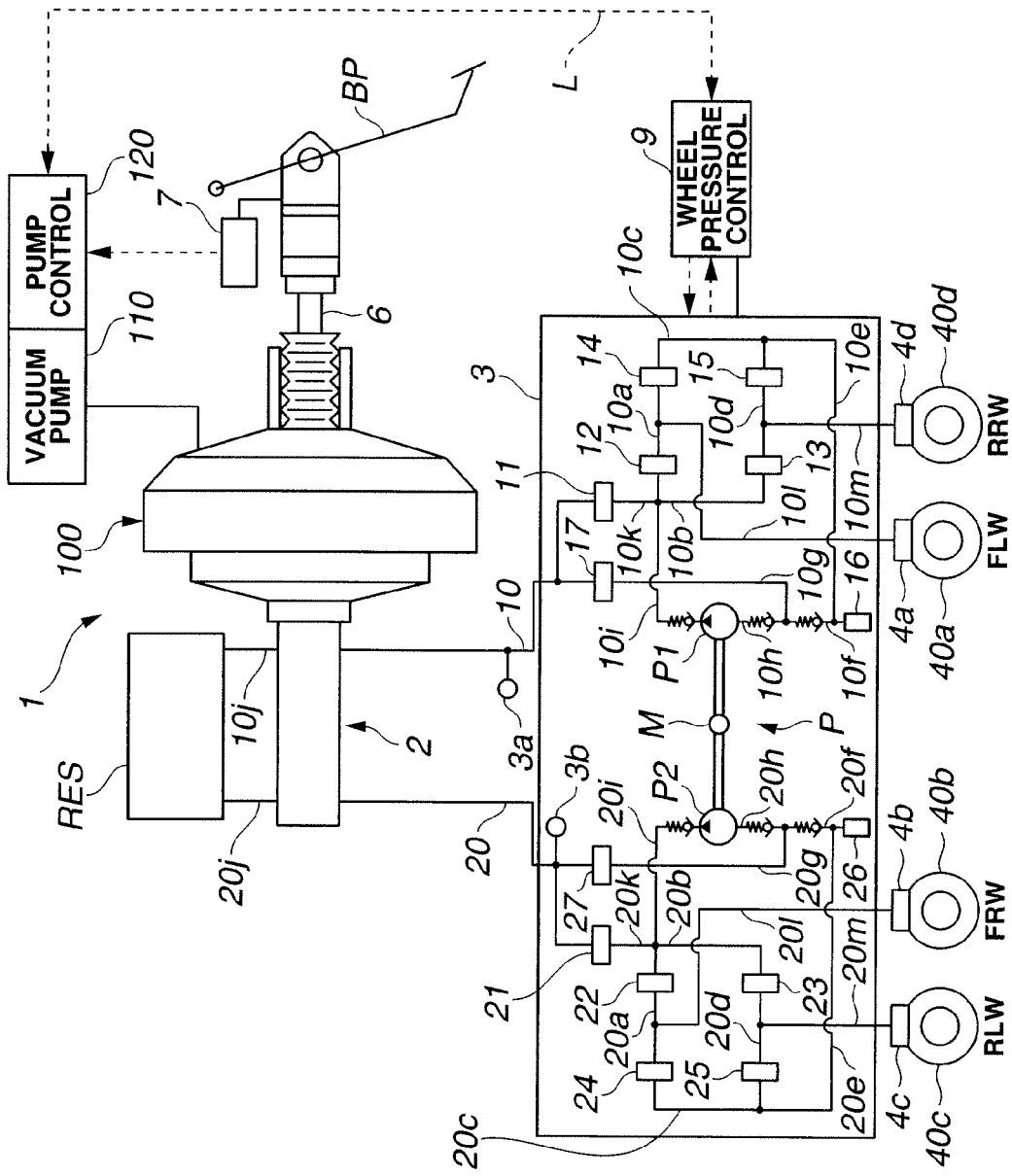
FIG. 8 is a schematic view showing a brake control system according to a fourth embodiment of the present invention.

FIG. 8 shows a brake control system according to a fourth embodiment. The brake control system 1 of the fourth embodiment includes a vacuum booster 100 of a known type, instead of the electric booster (5) including the electric drive motor 50. The vacuum booster 100 utilizes a vacuum pump 110, and a vacuum pump control section 120 (corresponding to the first controller or first control unit) controls the master pressure Pmc by controlling vacuum pump 110. As the construction of vacuum pump control section 120, it is possible to employ a construction similar to the construction of the master pressure control section 8. In the other respects, the brake control system of the fourth embodiment is substantially identical to the system of one of the first, second and third embodiments. The brake control system of the fourth embodiment can provide similar effects as the preceding embodiments.

Although the invention has been described above with reference to certain embodiments of the invention, the invention is not limited to the embodiments described above. Modifications and variations of the illustrated embodiments described above will occur to those skilled in the art in light of the above teachings.

Wheel pressure regulating section (hydraulic modulator) 3 is not limited to the hydraulic circuit configuration shown in FIG. 1 (and FIG. 8). It is possible to employ one of various other possible hydraulic circuit configuration for wheel pressure regulating section 3. The electric booster of the first, second and third embodiments includes the mechanism as shown in FIG. 1 for transmitting rotation from the motor 50 toward primary piston 2b. However, it is possible to employ various other types of the electric booster using a motor. The drive motor 50 is not limited to the three-phase motor. It is possible to employ any of various other AC or DC motors. The use of a DC brushless motor is advantageous in controllability, lower noise level and durability. Instead of the belt drive, it is possible to employ, as speed reducer 51, a speed reduction gear system, for example. As a power conversion mechanism of the rotation-translation converting mechanism 55, it is possible to a rack and pinion mechanism or some other mechanism instead of the ball screw type. As the pump P of wheel pressure regulating mechanism 3, it is possible to employ various pumps such as plunger pump and trochoid pump instead of a gear pump. The gear pump is superior in the nose level. Unlike the configuration of FIG. 7, it is possible to employ a first communication system of CAN communication and a second communication system including only one communication line for failsafe operation as in FIG. 2. That is, the communication systems need not be the same type. In this case, it is possible to provide the same effects as in the fourth embodiment, and to reduce the cost by eliminating the need of providing a plurality of CAN systems.

According to the illustrated embodiments, master pressure regulating section 5 or vacuum booster 100 (including vacuum pump 110) can serve as a main component of a boosting means for increasing a master cylinder pressure (Pmc) in accordance with a driver's brake operation. According to one of possible constructions, the boosting means may further comprise a master cylinder. Wheel pressure regulating section 3 can serve as a modulating means for increasing a wheel pressure, and the modulating means may further include at least one wheel cylinder. According to one of possible constructions, a boost controlling means for controlling the boosting means may include at least a CPU (such as CPU 80) of a computer; and a modulation controlling means for controlling the modulating means may include at least (a CPU of) a computer, or the entirety of wheel pressure control section 9. A communicating means for connecting the boost controlling means (8) and the modulation controlling means (9) may include at least one communication line, and may further include an interface or interfaces (such as 86f, 86g and 86h) included in either or both of master pressure control section 8 and wheel pressure control section 9. At least one of CPU 80, monitor control circuit 83, and sensors used for detecting a failure can serve as a failure detecting means for monitoring a boost system. Memory circuit 85 or some other memory in master cylinder control section 8 can serve as a storage means for storing an abnormal condition detected by the failure detecting means. Wheel pressure control section 9 or a CPU of wheel pressure control section 9 can serve as a backup controlling means (S13, S14) for increasing the wheel cylinder pressure. According to the illustrated embodiments, a brake control method comprises: a step (S14, S20) of increasing a wheel cylinder pressure in one of a first control mode (S20) of controlling the wheel cylinder pressure with a brake boost system assisting a master cylinder, and a second control mode (S14) of controlling the wheel cylinder pressure with a hydraulic modulation system including a pressure source; and a step (S1) of monitoring a condition of the boost system through communication between the boost system and the hydraulic modulation system.

According to the illustrated embodiments, a brake control apparatus comprises: a master cylinder to produce a master cylinder pressure in accordance with a driver's brake input; a brake booster to assist the master cylinder to increase the master cylinder pressure; a wheel cylinder to produce a braking force by receiving a wheel cylinder pressure; a hydraulic modulator to produce the wheel cylinder pressure by regulating the master cylinder pressure supplied from the master cylinder, the hydraulic modulator including a pressure source to increase the wheel cylinder pressure beyond the master cylinder pressure of the master cylinder; and a controlling section to control the brake booster to form a boost control system (5, 8) to increase the master cylinder pressure in accordance with the driver's brake input, and to control the hydraulic modulator to form a modulating system (3, 9) to increase the wheel cylinder pressure with the hydraulic modulator in place of the boost system, the controlling section including a monitoring section (80, 83, 88b, 81b, 86f) to detect a failure in the boost system, and to set the boost system to a failsafe mode and the modulating system to a backup mode, upon detection of a failure in the boost system, before a driver's brake operation.

This application is based on a prior Japanese Patent Application No. 2007-212523 filed on Aug. 17, 2007. The entire contents of this Japanese Patent Application No. 2007-212523 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus comprising:
a master cylinder operated by a driver's brake operation;

a brake operation sensing device to sense one of a stroke and a pedal force of a brake pedal, as a brake operation quantity;

a master cylinder pressure sensor to sense a master cylinder pressure of the master cylinder;

a brake booster to operate the master cylinder in accordance with the brake operation quantity sensed by the brake operation sensing device, to increase a wheel cylinder pressure of a wheel cylinder;

a first control unit which is connected with the brake operation sensing device and which is configured to control the brake booster to increase the master cylinder pressure of the master cylinder in accordance with the brake operation quantity sensed by the brake operation sensing device in a normal state;

a fluid pressure regulating hydraulic modulator between the master cylinder and the wheel cylinder, the fluid pressure regulating hydraulic modulator including a pressure source to increase the wheel cylinder pressure;

a second control unit connected with the master cylinder pressure sensor and configured to control the fluid pressure regulating hydraulic modulator; and a communication line connecting the first control unit and the second control unit;

wherein the first control unit includes a boost condition transmitting section to transmit, through the communication line, a backup request signal if a boost system formed by the brake booster and the first control unit is in an abnormal condition; and wherein the second control unit is configured to perform a backup control to increase the wheel cylinder pressure by sensing, as the brake operation quantity, the master cylinder pressure of the master cylinder with the master cylinder pressure sensor and by operating the fluid pressure regulating hydraulic modulator in accordance with the master cylinder pressure sensed with the master cylinder pressure sensor, in response to the backup request signal sent from the boost condition transmitting section.

2. The brake control apparatus as claimed in claim 1, further comprising a nonvolatile memory in one of the first and second control units and which stores information on the abnormal condition of the boost system based on the backup request signal when a brake operation is in progress, and when no brake operation is performed.

3. The brake control apparatus as claimed in claim 1,
wherein the fluid pressure regulating hydraulic modulator comprises:
the pressure source including a pump to suck a brake fluid from the master cylinder; and
a gate valve between the master cylinder and the wheel cylinder and arranged to limit discharge of the brake fluid from the wheel cylinder toward the master cylinder when the gate valve is urged in a valve closing direction, and
wherein the second control unit is configured to perform the backup control by producing a pump-up pressure to increase the wheel cylinder pressure with the pump in a state in which the gate valve is urged in the valve closing direction.

4. The brake control apparatus as claimed in claim 1, wherein the communication line includes a line for one of CAN communication, serial communication other than CAN and flex-ray communication.

5. The brake control apparatus as claimed in claim 1, wherein the second control unit is configured to receive the backup request signal through the communication line when an abnormal condition occurs in a communication through the communication line, and to perform the backup control by controlling the fluid pressure regulating hydraulic modulator in response to the abnormal condition of the communication.

6. The brake control apparatus as claimed in claim 1, further comprising a plurality of communication lines connecting the first and second control units, wherein the first control unit is configured to control the wheel cylinder pressure by controlling the brake booster even if one of the communication lines is in an abnormal communication condition.

7. The brake control apparatus as claimed in claim 1, wherein the first control unit is configured to normally hold the communication line in a first state representing a normal condition of the brake booster and the first control unit, and to change the communication line from the first state to a second state representing existence of the abnormal condition in at least one of the brake booster and the first control unit when a failure is detected in at least one of the brake booster and the first control unit.

8. The brake control apparatus as claimed in claim 7, wherein one of the first control unit and the second control unit is configured to turn the communication line from an off state to the first state when at least one of the first and second control units is turned to an on state, and hold the communication line continuously in the first state distinctive from the off state while the first and second control units remain in the on state without the abnormal condition being detected in the brake booster and the first control unit.

9. The brake control apparatus as claimed in claim 7, wherein one of the first control unit and the second control unit is configured to hold the communication line continuously in the first state by continuing to produce a periodical electric signal transmitted through the communication line.

10. The brake control apparatus as claimed in claim 1, wherein the brake booster includes an electric drive motor and a rotation-translation converting device which converts rotational power of the electric drive motor to translational power, and which pushes a piston of the master cylinder with the translational power to assist operation of the master cylinder.

11. The brake control apparatus as claimed in claim 1, wherein the first control unit includes a central processing unit for controlling an electric drive motor and detecting a failure in the brake booster, and a monitor control circuit connected with the central processing unit to exchange signals with the central processing unit and configured to detect a failure of the central processing unit; and the boost condition transmitting section of the first control unit is configured to transmit the backup request signal when the central processing unit or the monitor control circuit detects a failure.

12. The brake control apparatus as claimed in claim 1, wherein the first control unit is configured to hold the brake booster inoperative when the boost system is in the abnormal condition.

13. A brake control apparatus comprising:
a boosting means for increasing a master cylinder pressure in accordance with a driver's brake operation;
a brake operation sensing means for sensing a brake operation quantity by sensing one of a stroke and a pedal force of a brake pedal;
a master cylinder pressure sensing means for sensing a master cylinder pressure;
a modulating means for increasing a wheel cylinder pressure, the modulating means including a pressure source to increase the wheel cylinder pressure;
a boost controlling means, connected with the brake operation sensing means, for controlling the boosting means to increase the master cylinder pressure in accordance with the brake operation quantity sensed by the brake operation sensing means in a normal state;

a modulation controlling means, connected with the master cylinder pressure sensing means, for controlling the modulating means; and a communicating means for connecting the boost controlling means and the modulation controlling means, the boost controlling means including a failure detecting means for monitoring a boost system formed by the boosting means and the boost controlling means while the boost controlling means is in an on state, and for detecting an abnormal condition in the boost system, and a storage means for storing the abnormal condition detected by the failure detecting means, and the modulation controlling means including a backup controlling means for receiving a condition signal representing the abnormal condition stored in the storage means through the communicating means and for increasing the wheel cylinder pressure by sensing the master cylinder pressure as the brake operation quantity with the master cylinder pressure sensing means and by controlling the modulating means in accordance with the master cylinder pressure sensed with the master cylinder pressure sensing means, in response to the condition signal representing the abnormal condition stored in the storage means, received through the communicating means.

14. The brake control apparatus as claimed in claim 13, wherein the storage means includes a nonvolatile memory for storing the abnormal condition detected by the failure detecting means.

15. The brake control apparatus as claimed in claim 13, wherein the boosting means includes means for assisting operation of a master cylinder by pushing a piston of the master cylinder with an electric drive motor; and the backup controlling means includes a means for receiving information on the master cylinder pressure of the master cylinder sensed by the master cylinder pressure sensing means, and for controlling the modulating means in accordance with the master cylinder pressure sensed by the master cylinder pressure sensing means.

16. The brake control apparatus as claimed in claim 15, wherein the failure detecting means includes a central processing unit for controlling the electric drive motor and sensing a failure in the boosting means, and a monitor control circuit connected with the central processing unit to exchange signals with the central processing unit and configured to monitor a failure of the central processing unit.

17. The brake control apparatus as claimed in claim 13, wherein the boost controlling means for controlling the boosting means holds the boosting means inoperative when the abnormal condition in the boost system is detected by the failure detecting means.

18. A brake control apparatus comprising:
a master cylinder operated by a driver's brake operation;
a stroke sensor to sense a driver's brake operation quantity by sensing a brake stroke of a brake pedal;
a brake booster to increase a wheel cylinder pressure of a wheel cylinder by operating the master cylinder in accordance with the driver's brake operation;
a first control unit connected with the stroke sensor and configured to control operation of the brake booster to increase a master cylinder pressure of the master cylinder in accordance with the driver's brake operation quantity sensed by the stroke sensor in a normal state;
a master cylinder pressure sensor to sense the master cylinder pressure of the master cylinder;
a fluid pressure regulating section which is provided in addition to the brake booster and which includes a pressure source to increase the wheel cylinder pressure;
a second control unit connected with the master cylinder pressure sensor and configured to control the fluid pressure regulating section; and
a communication line arranged to connect the first control unit and the second control unit, and to communicate condition of a boost system formed by the brake booster and the first control unit,
wherein the first control unit includes a boost condition transmitting section to transmit, through the communication line, as failure information, a condition of the boost system, during an operative period and an inoperative period of the brake booster while the first control unit and the second control unit are in an on state,
wherein the second control unit is configured to determine the driver's brake operation quantity from a signal inputted from the master cylinder pressure sensor, and to perform a backup control to increase the wheel cylinder pressure by operating the fluid pressure regulating section in accordance with the driver's brake operation quantity determined from a signal from the master cylinder pressure sensor when the second control unit receives the failure information, and
wherein one of the first and second control units includes a nonvolatile memory storing the failure information when a brake operation is in progress, and when no brake operation is performed.

19. The brake control apparatus as claimed in claim 18, wherein the brake booster includes an input rod arranged to move with a brake pedal, and an electric drive motor to move a piston of the master cylinder, the input rod being arranged to operate the master cylinder by moving the piston of the master cylinder even in a state in which the electric drive motor is in a stop state.

20. The brake control apparatus as claimed in claim 18, wherein the first control unit is configured to detect an abnormal communication condition of the communication line, and to cause the backup control by the fluid pressure regulating section in a case of the abnormal communication condition.

21. The brake control apparatus as claimed in claim 18, further comprising a plurality of communication lines connecting the first and second control units, wherein the first control unit is configured to control the wheel cylinder pressure by controlling the brake booster even if one of the communication lines is in an abnormal communication condition.

22. The brake control apparatus as claimed in claim 18, further comprising two communication lines connecting the first and second control units, wherein the second control unit is configured to perform the backup control when the two communication lines are in an abnormal communication condition.

23. The brake control apparatus as claimed in claim 18, wherein the first control unit is configured to normally hold the communication line in a first state representing a normal condition of the brake booster and the first control unit, and to change the communication line from the first state to a second state representing existence of an abnormal condition in at least one of the brake booster and the first control unit when a failure is detected in at least one of the brake booster and the first control unit.

24. The brake control apparatus as claimed in claim 23, wherein one of the first control unit and the second control unit is configured to hold the communication line continuously in the first state by continuing to produce a periodical electric signal transmitted through the communication line.

25. The brake control apparatus as claimed in claim 18, wherein the first control unit is configured to hold the brake booster inoperative when the failure information of at least one of the brake booster and the first control unit is present.

* * * * *